United States Patent
Saleh et al.

(10) Patent No.: US 11,721,975 B2
(45) Date of Patent: Aug. 8, 2023

(54) SYSTEM AND METHOD FOR USE WITH MICROGRIDS HAVING INVERTER-BASED DISTRIBUTED GENERATORS

(71) Applicant: HIS MAJESTY THE KING IN RIGHT OF CANADA, AS REPRESENTED BY THE MINISTER OF NATURAL RESOURCES, Ottowa (CA)

(72) Inventors: Khaled Saleh, San Jose, CA (US); Ali Mehrizi-Sani, Blacksburg, VA (US)

(73) Assignee: HIS MAJESTY THE KING IN RIGHT OF CANADA, AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 59 days.

(21) Appl. No.: 17/302,357

(22) Filed: Apr. 30, 2021

(65) Prior Publication Data
US 2022/0014021 A1   Jan. 13, 2022

Related U.S. Application Data

(60) Provisional application No. 63/050,242, filed on Jul. 10, 2020.

(51) Int. Cl.
*H02J 3/00* (2006.01)
*H02J 3/38* (2006.01)
(Continued)

(52) U.S. Cl.
CPC ............. *H02J 3/001* (2020.01); *H02H 3/042* (2013.01); *H02H 3/52* (2013.01); *H02H 7/122* (2013.01); *H02J 3/381* (2013.01)

(58) Field of Classification Search
CPC .......... H02H 3/042; H02H 3/52; H02H 7/122; H02J 3/001; H02J 3/381
See application file for complete search history.

(56) References Cited

U.S. PATENT DOCUMENTS

| 4,903,163 A | 2/1990 | Atwater |
|---|---|---|
| 9,118,205 B2 | 8/2015 | Ou |

(Continued)

FOREIGN PATENT DOCUMENTS

| CN | 102540009 A | * 7/2012 |
|---|---|---|
| CN | 108802575 A | * 11/2018 |

(Continued)

OTHER PUBLICATIONS

Toshiaki, Y., et al. "A basic study on novel islanding detection method for photovoltaic inverters by positive feedback of harmonic voltage" :Taylor & Francis Online https://www.tandfonline.com/doi/full/10.1080/22348972.2016.1202397. Accessed on Jul. 9, 2021. 6 pages.

(Continued)

*Primary Examiner* — Harry R Behm
(74) *Attorney, Agent, or Firm* — Gottlieb, Rackman & Reisman, PC

(57) ABSTRACT

A system and method for controlling microgrids composed of inverter-based distributed generation (IBDG) units. This includes a method using multiple IBDGs to inject impedance-modulated harmonic currents during fault conditions, with each IBDG injecting a unique, differentiable harmonic (i.e., non-fundamental) order from neighboring IBDGs. The method also involves using an inverse time-harmonic-current characteristic to detect faults by locally measuring the harmonic currents injected by IBDGs. A harmonic directional overcurrent relay is also used for fault detection.

9 Claims, 26 Drawing Sheets

(51) Int. Cl.
  H02H 3/52 (2006.01)
  H02H 7/122 (2006.01)
  H02H 3/04 (2006.01)

(56) References Cited

U.S. PATENT DOCUMENTS

| | | |
|---|---|---|
| 10,108,153 B2 | 10/2018 | Park |
| 10,483,754 B2 | 11/2019 | Hong |
| 10,514,663 B2 | 12/2019 | Lin |
| 10,622,805 B2 | 4/2020 | Ishchenko |
| 10,635,058 B2 | 4/2020 | Sanders |
| 10,868,422 B1 * | 12/2020 | Jia .......................... H02S 50/00 |
| 2002/0039299 A1 | 4/2002 | Nishimura et al. |
| 2014/0152331 A1 * | 6/2014 | Wagoner ................ G01R 27/16 |
| | | 324/705 |
| 2018/0034317 A1 * | 2/2018 | Khatib .................... H02J 3/381 |
| 2020/0006945 A1 | 1/2020 | Lemberg et al. |

FOREIGN PATENT DOCUMENTS

| | | | | |
|---|---|---|---|---|
| CN | 112803478 A | * | 5/2021 | ............... H02H 7/26 |
| JP | 2015033312 A | * | 2/2015 | |

OTHER PUBLICATIONS

Chandrasekar, T., et al. "A Study and Review of Current Injection Techniques": ResearchGate https://www.researchgate.net/publication/305032785 . Accessed on Jul. 9, 2021. 6 pages.

Oon, K.H., et al. "A Novel Reactive Current Injection (RCI) Control for Microgrid Protection with Inverter Based Distributed Generation (IBDG)",Article. Sep. 1, 2019. University of Malaya. Malaysia. 19 Pages.

Saleh, Khaled et al. "Harmonic Directional Overcurrent Relay for Islanded Microgrids With Inverter-Based DGs". IEEE Systems Journal 15:2. Apr. 6, 2020 doi:10.1109/JSYST.2020.2980274. 8 pages.

* cited by examiner

IBDGs HARMONIC INJECTION CHARACTERISTIC PARAMETERS

| IBDG $n$ | $h$ | Rating [MVA] | $I_{dg,n}$ [A] | $Z_{pu,c,n}$ [Ω] | $\lfloor I_{inj,n}^h \rfloor$ [A] | $\lceil I_{inj,n}^h \rceil$ [A] |
|---|---|---|---|---|---|---|
| 1 | 5 | 6 | 277.70 | 0.096 | 24.18 | 183.34 |
| 2 | 7 | 3 | 138.90 | 0.073 | 24.18 | 91.67 |
| 3 | 5 | 5 | 231.50 | 0.044 | 24.18 | 152.72 |
| 4 | 7 | 4 | 185.20 | 0.055 | 24.18 | 122.23 |

FIG. 16

Optimal HDOCR Settings

| HDOCR | $h$ | TDS | $I_{pu}$ [A] | HDOCR | $h$ | TDS | $I_{pu}$ [A] |
|---|---|---|---|---|---|---|---|
| $R_{111}$ | 5 | 0.1431 | 89.079 | $R_{111}$ | 5 | 0.1431 | 95.81 |
| $R_{112}$ | 5 | 0.2986 | 24.20 | $R_{112}$ | 5 | 0.2460 | 24.20 |
| $R_{121}$ | 5 | 0.0923 | 114.73 | $R_{121}$ | 5 | 0.0722 | 67.73 |
| $R_{122}$ | 5 | 0.0919 | 95.38 | $R_{122}$ | 5 | 0.1045 | 78.75 |
| $R_{123}$ | 5 | 0.0948 | 76.67 | $R_{123}$ | 7 | 0.1383 | 64.26 |
| $R_{211}$ | 7 | 0.1642 | 44.90 | $R_{211}$ | 7 | 0.1316 | 50.18 |
| $R_{212}$ | 7 | 0.2199 | 24.20 | $R_{212}$ | 7 | 0.1482 | 41.78 |
| $R_{221}$ | 7 | 0.0933 | 68.40 | $R_{221}$ | 7 | 0.0625 | 70.67 |
| $R_{222}$ | 7 | 0.0944 | 56.15 | $R_{222}$ | 7 | 0.0929 | 56.35 |

FIG. 17

HDOCRs OPERATING CURRENTS, HCI, AND TIMES UNDER THREE-PHASE FAULT AT F7 WITH DIFFERENT FAULT RESISTANCES

| $R_f$ (Ω) | Primary | | | | Backup | | | |
|---|---|---|---|---|---|---|---|---|
| | HDOCR | $I^{+,h}$ (A) | $t$ (s) | HCI | HDOCR | $I^{+,h}$ (A) | $t$ (s) | HCI |
| 1 | $R_{421}$ | 125 | 1.13 | 1.5 | $R_{123}$ | 99 | 2.59 | 1.5 |
| | $R_{312}$ | 184 | 1.00 | 1.5 | $R_{311}$ | 187 | 1.36 | 1.5 |
| 3 | $R_{421}$ | 95 | 2.18 | 1.5 | $R_{123}$ | 79 | 22.15 | 1.5 |
| | $R_{312}$ | 133 | 1.20 | 1.5 | $R_{311}$ | 140 | 2.41 | 1.5 |

FIG. 18

HDOCRs OPERATING CURRENTS, HCL, AND TIMES UNDER THREE-PHASE FAULT AT DIFFERENT FAULT LOCATIONS

| Fault | Primary | | | | Backup | | | |
|---|---|---|---|---|---|---|---|---|
| | HDOCR | $I^{+,h}$ (A) | $t$ (s) | HCl | HDOCR | $I^{+,h}$ (A) | $t$ (s) | HCl |
| F1 | $R_{121}$ | 229.99 | 0.923 | 1.5 | $R_{222}$ | 87.93 | 1.467 | 1.5 |
| | $R_{413}$ | 125.92 | 0.929 | 1.5 | $R_{412}$ | 125.91 | 1.1322 | 1.5 |
| F2 | $R_{111}$ | 354.9 | 0.942 | 1.5 | $R_{413}$ | 101.77 | 1.154 | 1.5 |
| | $R_{222}$ | 112.27 | 0.947 | 1.5 | $R_{221}$ | 112.51 | 1.305 | 1.5 |
| F3 | $R_{112}$ | 214.44 | 0.937 | 1.5 | $R_{111}$ | 214.44 | 1.130 | 1.5 |
| | $R_{221}$ | 136.77 | 0.936 | 1.5 | $R_{322}$ | 119 | 1.604 | 1.5 |
| F4 | $R_{211}$ | 148.1 | 0.951 | 1.5 | $R_{112}$ | 175.61 | 1.034 | 1.5 |
| | $R_{322}$ | 156.52 | 0.961 | 1.5 | $R_{321}$ | 156.89 | 1.357 | 1.5 |
| F5 | $R_{212}$ | 123.63 | 0.928 | 1.5 | $R_{211}$ | 123.63 | 1.123 | 1.5 |
| | $R_{321}$ | 194.73 | 0.929 | 1.5 | $R_{422}$ | 91.47 | 1.440 | 1.5 |
| F6 | $R_{311}$ | 254.17 | 0.931 | 1.5 | $R_{212}$ | 99.2 | 1.075 | 1.5 |
| | $R_{422}$ | 116.10 | 0.938 | 1.5 | $R_{421}$ | 116.36 | 1.292 | 1.5 |
| F7 | $R_{312}$ | 214 | 0.932 | 1.5 | $R_{311}$ | 214 | 1.132 | 1.5 |
| | $R_{421}$ | 140.9 | 0.931 | 1.5 | $R_{123}$ | 116.92 | 1.566 | 1.5 |
| F8 | $R_{411}$ | 176 | 0.951 | 1.5 | $R_{312}$ | 175.59 | 1.028 | 1.5 |
| | $R_{123}$ | 153.89 | 0.945 | 1.5 | $R_{122}$ | 154.21 | 1.332 | 1.5 |
| F9 | $R_{412}$ | 150.81 | 0.923 | 1.5 | $R_{411}$ | 150.79 | 1.125 | 1.5 |
| | $R_{122}$ | 191.20 | 0.918 | 1.5 | $R_{121}$ | 191.15 | 1.259 | 1.5 |

FIG. 19

SYSTEM AND METHOD FOR USE WITH MICROGRIDS HAVING INVERTER-BASED DISTRIBUTED GENERATORS

RELATED APPLICATIONS

This application is a non-provisional patent application which claims the benefit of U.S. Provisional Application No. 63/050,242 filed on Jul. 10, 2020.

TECHNICAL FIELD

The present invention relates to microgrids that are composed of inverter-based distributed generation (IBDG) units. More specifically, the present invention relates to using multiple IBDGs to inject impedance-modulated harmonic currents to detect faults by locally measuring the harmonic currents injected by the IBDGs.

BACKGROUND

A microgrid is a group of interconnected loads and distributed energy resources within clearly defined electrical boundaries that acts as a single controllable entity with respect to the overall power grid. A microgrid can connect and disconnect from the grid to enable operation in both grid-connected or island-mode. Microgrids both reduce costs and provide a revenue stream for their customers. They reduce costs through the efficient management of energy supply and provide revenue by selling energy and services back to the grid. However, microgrid stability is an ongoing concern and devising an adequate protection scheme for microgrids is a formidable challenge.

Faults in a microgrid behave differently from faults in the conventional power system and therefore, the existing methods are not adequate for their protection. First, fault current magnitudes measured by a protective device for a given fault can be either extremely high or extremely low depending on the mode of operation of the microgrid, i.e., grid-connected or island-mode. Such a large difference in current magnitude makes coordination of available distribution protective devices, such as overcurrent relays, fuses, and reclosers, difficult and even infeasible. Second, microgrids often host a large number of renewable energy sources interfaced via power electronic inverters, i.e., inverter-based distributed generator (IBDG) units. These IBDG units not only have a low fault current contribution that is typically limited to 120% of their rated current, but they also have an adverse impact on the existing commercial torque-based and impedance-based directional elements because of the feedforward compensation of the grid voltage in the control system of IBDGs. Such fault behavior renders existing directional overcurrent and distance relays impractical for microgrid protection. Third, elaborate protection schemes used in transmission networks, e.g., differential relays, are deemed uneconomical for microgrid that is inherently small-scale. Consequently, a simple and inexpensive relaying solution is required.

Various methods have been recently proposed to address the aforementioned microgrid protection challenges. In prior attempts at a solution, features extracted from phase and sequence currents using wavelet transform have been used to create a decision tree data-mining model for fault detection and classification. In still other prior attempts at a solution, the transient response of the inverter current waveform is monitored to detect faults in an islanded microgrid. However, these methods are not selective in that they do not identify the fault zone.

Multi-objective particle swarm optimization algorithms have been proposed to optimally set directional overcurrent relays (DOCR) in meshed microgrids considering all modes of operation. However, DOCRs will fail to detect faults in islanded microgrids with IBDGs only, i.e., no synchronous-based distributed generators (DGs), due to the low fault currents. Though an adaptive DOCR based on the positive- and negative-sequence superimposed currents has previously been proposed, setting a threshold that distinguishes between load and fault currents to avoid nuisance tripping can be difficult because IBDGs have a low fault current contribution.

Still further, communication-based approaches that utilize the difference in power flow, current spectral energy content, sequence component, impedance, and traveling wave polarities have each also been proposed. However, these methods require an extensive and robust communication network, which is a significant investment often unavailable in a microgrid. To use simple DOCRs with the same settings for both grid-connected and islanded microgrids, there has been proposed a controllable supercapacitor integrated with IBDGs to increase their fault current. However, these supercapacitors are expensive.

Modification of IBDG control schemes to aid in achieving various protection objectives has been previously explored in the art. For example, reduction of IBDG fault current contribution based on its terminal voltage has been proposed to mitigate the impact of the injected current on the fuse-recloser coordination in a distribution network. Likewise, control schemes that regulate the sequence components of the current of an IBDG during a fault such that existing phase selection methods can accurately select the faulted phases is known. Still further prior methods include the output frequency of at least one IBDG being changed upon detection of a fault whereupon a differential protection scheme detects faults based on the differences in the frequency components of the current measured at two ends of a feeder. However, this method relies on communication.

In yet another known IBDG control scheme, the IBDG controller is modified to inject a fifth harmonic component that is used as a fault indicator by overcurrent relays while the fundamental fault current is limited via a synthetic impedance droop and is used for coordination between upstream and downstream relays in an islanded radial microgrid. However, relying on IBDG's fundamental fault current for protection coordination is not applicable to microgrids with multiple IBDGs because of (i) bidirectional flow of fault currents and (ii) fault contribution of IBDGs that can be lower than load current, which leads to a decrease rather than increase in the current seen by a relay.

The present invention seeks to mitigate the problems associated with the aforementioned schemes.

SUMMARY

This present invention provides a system and method which addresses the problem of microgrid protection by capitalizing on existing IBDGs and microprocessor-based DOCRs which are the simplest relays for a system with bidirectional fault currents. The present invention eliminates the dependency of digital protection relaying on fundamental fault currents and instead utilizes IBDGs to synthesize unique harmonic injected currents. The injected harmonic currents flow toward the fault location and are measured by digital relays. These currents are then used to devise a selective and sensitive harmonic directional overcurrent relay (HDOCR).

The present invention relates to microgrids that are composed of IBDGs. In particular, the present invention uses multiple IBDGs to inject impedance-modulated harmonic currents during fault conditions, with each IBDG injecting a unique, differentiable harmonic (i.e., non-fundamental) order from its neighboring IBDG. A harmonic directional overcurrent relay is also used in the invention for fault detection. The invention involves using an inverse time-harmonic-current characteristic to detect faults by locally measuring the harmonic currents injected by IBDGs.

The present invention includes three main components: modifications to the IBDG controllers to inject the synthetic harmonic currents, new relaying methodology based on the introduced currents, and an optimization process to coordinate primary and backup pairs. Unlike prior methods, the present inventive HDOCR implementation decouples the overcurrent functions required to detect faults in grid-connected and islanded modes. In other words, the present invention introduces a second dimension for relays, which effectively detects contribution of high fault currents from grid or synchronous-based DGs using the fundamental current while the low fault currents injected by IBDGs are detected using the harmonic current. These dimensions do not affect each other because grid or synchronous based-DGs injection of fundamental current is based on typical short-circuit analysis factors such as their sub transient impedance while IBDG injection is controlled and based on the inventive impedance-modulated harmonic injection function.

Aspects of the present invention include methods augmented to IBDG controllers that involve: 1) an impedance-modulated harmonic current injection method added to the IBDG controller, and 2) a mechanism to differentiate harmonic orders injected by neighboring IBDGs along the same feeder.

Aspects of the present invention also relate to an HDOCR that involve: 1) a new inverse time-harmonic-current method that locally measures the harmonic currents injected by IBDGs for fault detection, 2) a new directional element that relies on the ratio of locally measured harmonic currents injected by IBDGs on both sides of the HDOCR, 3) a protection coordination optimization (PCO) problem formulation to optimally set primary and backup HDOCRs.

The present invention is applicable on radial and ring islanded microgrids with several IBDGs under various faults. Unlike existing protection schemes that operate using fundamental currents, the present invention includes injected synthetic harmonic current magnitudes that depend on the fault location, which facilitates coordination of primary/backup pairs. Given that the synthetic harmonic currents are injected only during fault conditions, low pickup current relay settings may be used to enhance the sensitivity of the protection scheme according to one aspect of the present invention. To address the limitations of existing directional elements, the inventive harmonic current based directional element eliminates the dependency on voltage/current phase angles to determine the fault direction in a microgrid, which in turn enhances the selectivity of the protection approach. Unlike differential relaying, the inventive system and method requires no form of communication, and thus is economically viable. The present invention may be successfully applied to microgrids with different configurations, i.e., radial and ring topologies. The effective coordination of primary and remote backup HDOCRs via optimally setting HDOCRs enhances the reliability of the protection methodology.

In a first aspect, the present invention provides a system for use with a microgrid having a plurality of inverter-based distributed generations, said system comprising: an injection unit embodied in a computer readable medium for providing each one of a plurality of inverters within said microgrid with a corresponding one of a plurality of differentiable harmonic currents upon a fault condition within said microgrid; and a measuring unit (relay) embodied in said computer readable medium for providing detection of said harmonic currents; wherein isolation of a faulted section of said microgrid is enabled based upon said harmonic currents detected.

In a second aspect, the present invention provides a method for use with a microgrid having a plurality of inverter-based distributed generations, said method comprising: providing, by way of an injection unit embodied in a computer readable medium, to each one of a plurality of inverters within said microgrid a corresponding one of a plurality of differentiable harmonic currents upon a fault condition within said microgrid; detecting, by way of a measuring unit embodied in a computer readable medium, said harmonic currents; and isolating a faulted section of said microgrid based upon said harmonic currents detected.

In a third aspect, the present invention provides a computer readable medium including instructions forming steps for use with a microgrid having a plurality of inverter-based distributed generations, said instructions executable by a processor for: providing to each one of a plurality of inverters within said microgrid a corresponding one of a plurality of differentiable harmonic currents upon a fault condition within said microgrid; detecting said harmonic currents; and isolating a faulted section of said microgrid based upon said harmonic currents detected.

BRIEF DESCRIPTION OF THE DRAWINGS

The present invention will now be described by reference to the following figures, in which identical reference numerals refer to identical elements and in which:

FIG. 16 is a table summarizing ratings and harmonic injection characteristics for each IBDG according to an embodiment of the present invention;

FIG. 17 is a table showing op_timal settings for HDOCRs according to an embodiment of the present invention;

FIG. 18 is a table showing the magnitude of harmonic currents measured by primarv and backup HDOCRs during a three-phase fault having different fault resistances according to an embodiment of the present invention; and FIG. 19 is a table showing harmonic currents; HC1; and operating times of HDOCRs during three-phase faults at different locations according to an embodiment of the present invention.

DETAILED DESCRIPTION

The present invention addresses the shortcomings of conventional DOCR-based protection schemes in islanded microgrids with IBDGs by providing a modification to existing IBDG controllers and microprocessor-based DOCRs logic. In accordance with the present invention, IBDGs are equipped with impedance modulated harmonic current injection. Each IBDG injects a harmonic component different from the one injected by the neighboring IBDGs. This enables the design of an HDOCR with a new harmonic-based (i) directional element and (ii) overcurrent function. Furthermore, optimization maintains coordination between primary and backup HDOCRs in radial and ring microgrids. Unlike existing DOCR-based methods for microgrids, the present invention simplifies the coordination of relays by decoupling the overcurrent functions for grid-connected and islanded modes of operation of the microgrid, thus eliminating the problem of significant variation of short-circuit currents between these two modes. Moreover, the challenge of limited fault current contribution of IBDG-based islanded microgrids is addressed by discarding fundamental fault currents and instead relying on harmonic currents with sufficient magnitudes for accurate fault detection. Unlike existing directional elements that malfunction in a microgrid due to their dependency on current/voltage phase angles, the present invention relies on the ratio of locally measured harmonic current components injected by IBDGs on both sides of the HDOCR. The system and method operate entirely based on local measurements. The protection in accordance with the present invention is selective and sensitive and maintains coordination of primary and backup HDOCR pairs under various fault conditions.

The present system and method will now be described in detail in terms of: 1) a new harmonic injection methodology for one and multiple IBDGs, 2) new HDOCRs methodologies including implementation of an inverse time-harmonic current characteristic and harmonic directional element, and 3) a new PCO formulation to set HDOCRs. A performance evaluation of the present invention is also provided exemplifying protection under various fault conditions.

The present inventive system and method systematically injects harmonic currents in the islanded microgrid during fault conditions. The inventive HDOCRs measure and utilize this current for fault detection, fault direction identification, and protection coordination. This section first presents the inventive harmonic current injection characteristic and a detailed example of its operation in a simple one-feeder, one-IBDG microgrid. Implementation to multiple IBDGs in radial and ring microgrids will be readily apparent based upon the discussion herein related to coordination of the harmonic current injection of IBDGs.

Figure 1:
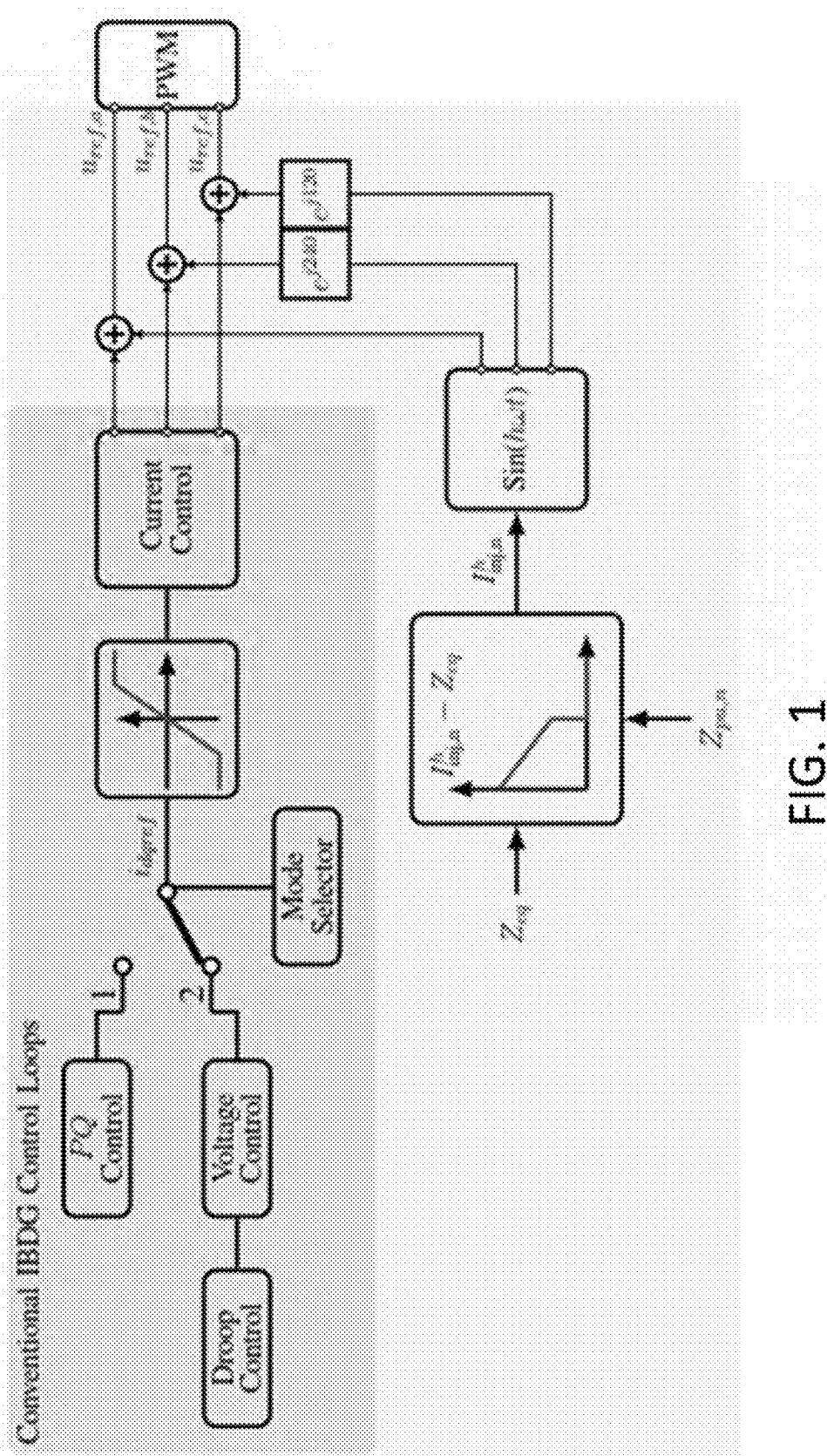
FIG. 1 is a schematic illustrating the impedance-modulated harmonic injection characteristic according to one aspect of the present invention.
Figure 2:
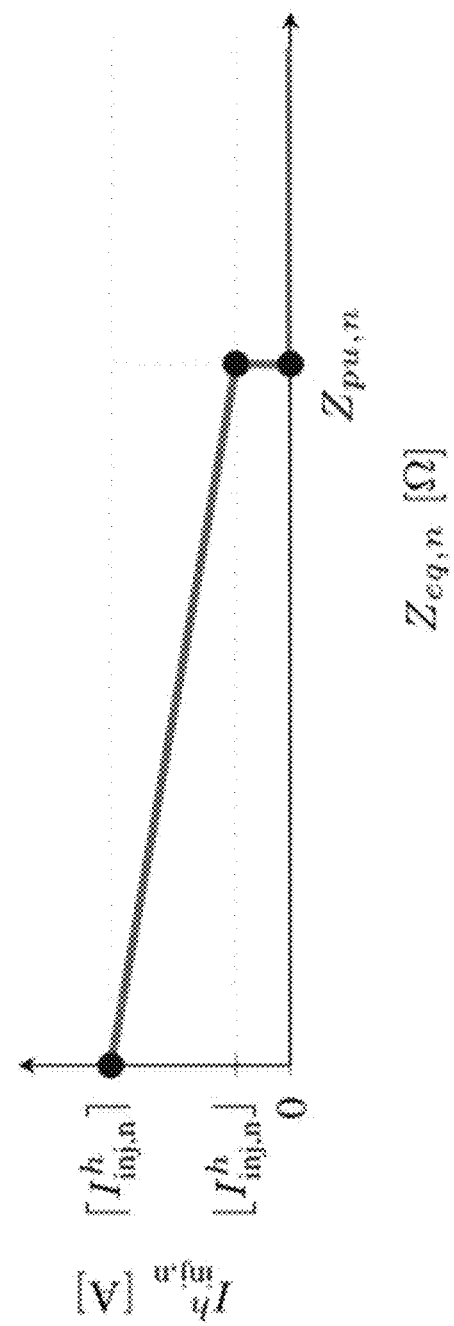
FIG. 2 shows linear characteristics that is used to determine the injected harmonic current according to one aspect of the present invention.

With reference to FIG. 1, a schematic related to one embodiment is shown in accordance with the present invention in order to illustrate the inventive impedance-modulated harmonic injection characteristic (shown in yellow). Here, a controller comprised of conventional IBDG control loops is shown using the inventive harmonic injection method. The modulating signals of the IBDG, generated by the conventional control loops, are augmented with a harmonic injection function before being fed to the PWM block. To enable fault zone identification and protection coordination, the injected harmonic current $I_{inj,n}{}^h$ by IBDG n should change based on the fault severity, i.e., fault location and fault resistance. The fault severity and its closeness to IBDG n may be inferred by inspecting the magnitude of the equivalent impedance, $Z_{eq,n}$, of the microgrid seen from the terminals of IBDG n, which is calculated by measuring its output rms current $i_{rms,n}$ and voltage $V_{rms,n}$; a lower $Z_{eq,n}$ indicates a closer and more severe fault. $I_{inj,n}{}^h$ is then determined using the following linear characteristics as shown in FIG. 2 and with parameters as defined in Equation 1 below:

$$I_{inj,n}^h = \begin{cases} \lceil I_{inj,n}^h \rceil - \dfrac{\lceil I_{inj,n}^h \rceil - \lfloor I_{inj,n}^h \rfloor}{Z_{pu,n}}, & Z_{eq,n} \leq Z_{pu,n} \\ 0, & \text{otherwise.} \end{cases} \quad \text{(Eq. 1)}$$

It should be understood that the pickup impedance $Z_{pu,n}$ is used as a trigger for the harmonic current injection function of IBDG n. $Z_{pu,n}$ is set below the minimum $Z_{eq,n}$, which is attained at maximum loading. A five (5) percent margin is used for measurement error tolerance. This margin may be increased for overloading conditions. Accordingly, $Z_{pu,n}$ can be expressed by Equation 2 as:

$$Z_{pu,n} = \dfrac{Vt_{ll,n}^2}{S_{DG,n}} 0.95 \quad \text{(Eq. 2)}$$

With further reference to Equation 2, $Vt_{ll,n}$ and $S_{DG,n}$ are the terminal rms line to line voltage and apparent power ratings of IBDG n, respectively. $Z_{eq,n}$ drops below $Z_{pu,n}$ only under fault conditions upon which IBDG starts injecting the specified harmonic component. Non-fault transients such as load shedding, line outage, intermittent generation, and fault clearance cause $Z_{eq,n}$ to exceed $Z_{pu,n}$ upon which injection is halted.

The minimum harmonic current injection $\lfloor I_{inj,n}{}^h \rfloor$ is attained when $Z_{eq,n}=Z_{pu,n}$. This injection should be higher than the individual current harmonic components in the steady state. IEEE standard 519 recommends that current distortion for harmonic orders 3-7 is limited to 4% of the maximum load current at fundamental frequency (for systems with low short-circuit/load ratio). In the present method, $\lfloor I_{inj,n}{}^h \rfloor$ is set to 6% of the maximum load current $\lceil I_L \rceil$ in any given line. This higher value allows a margin to ensure distinguishing between normal and fault harmonic currents.

The maximum harmonic current injection $\lceil I_{inj,n}{}^h \rceil$ is attained when $Z_{eq,n}=0$, i.e., bolted three-phase fault at the terminals of IBDG n. During fault conditions, the magnitude of the IBDG current output is limited by the constraints $i_{dref}$ and $i_{qref}$ via the fault current limiter shown in FIG. 1. The upper and lower limits on active current $I_{dmax}$ and $I_{dmin}$ are set to $\pm \lambda \times I_{dg,n}$, where $\lambda$ is a factor typically between 1-1.5 to consider overloading and $I_{dg,n}$ is the IBDG rated current.

On the other hand, the upper and lower limits on reactive current $I_{qmax}$ and $I_{qmin}$ are set to give priority to active current. These limits are equal to $\pm\sqrt{I_{dmax}^2-I_{dref}^2}$. Based on the above limits, the maximum total rms current contribution of IBDG n to fault current is $\gamma \times I_{dg,n}$, where $\gamma$ is typically set equal to $\lambda$. However, a margin between $\gamma$ and $\lambda$ should be set to accommodate the inventive harmonic current injection. For example, to adhere to the rule of thumb of limiting the total rms current of IBDG n to 120% of its rated current $I_{dg,n}$ [31], i.e., $\gamma=1.2$, the fault current limiter is set to $I_{dg,n}$, i.e., $\lambda=1$. This leaves a 20% room for the harmonic current. Accordingly, $\lceil I_{inj,n}{}^h \rceil$ is computed as provided in Equation 3, $$\lceil I_{inj,n}{}^h \rceil = \sqrt{\gamma^2-\lambda^2} I_{dg,n} = 0.66 I_{dg,n} \quad \text{(Eq. 3)}$$

It should be noted that $\gamma$ and $\lambda$ may be set to any values within the aforementioned range to achieve overloading objectives as long as sufficient margin is maintained between them. In this exemplary embodiment, a minimum of 20% margin is used to provide sufficient harmonic current magnitude, i.e., above $\lfloor I_{inj,n}{}^h \rfloor$, for HDOCRs to detect. However, higher margins may be considered depending on the overcurrent capability of the inverter switches.

In terms of the harmonic component h injected by IBDG n, it should be noted that h should be lower than ten to avoid overlapping with the inverter's output LCL filter, which is commonly designed with a resonant frequency between ten times the line frequency and one-half of the switching frequency. Consequently, the lowest available harmonic orders and the one used by the scheme are 3, 5, and 7, because the remaining low-order harmonics (2 and 6) are dominant frequencies during unbalanced transients. Unlike conventional harmonics with a phase shift of $h\phi$, the present invention involves the injection of synthetic harmonics, which are designed with a phase shift of $\phi$ as shown in FIG. 1. Therefore, while conventional 3rd and 5th harmonics appear as zero-sequence and negative-sequence components, respectively, their synthetic counterparts are positive sequence. Such modification (i) allows the use of triplen harmonics and consequently, the use of lower-order harmonics, and (ii) avoids confusion with harmonics that already exist in the microgrid.

Figure 3:
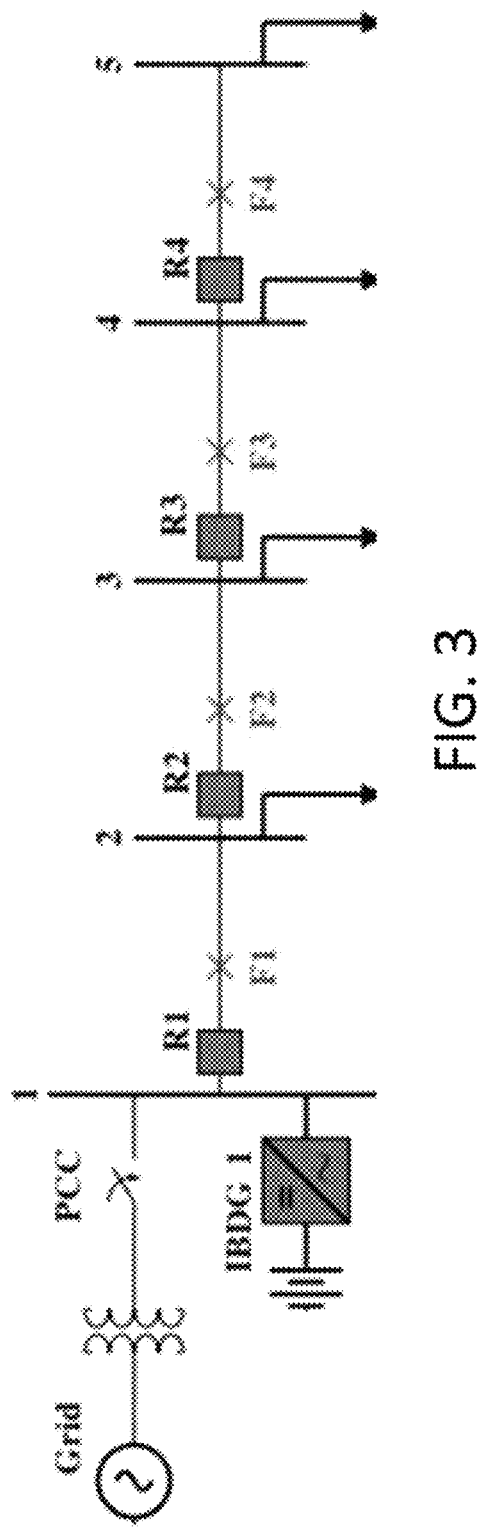
FIG. 3 schematically illustrates a five-bus islanded microgrid with one IBDG and is used to explain and illustrate the effectiveness of the methodology of the present invention.

An example of single harmonic current injection in accordance with the present invention will now be discussed. To demonstrate the effectiveness of the inventive harmonic injection methodology, four bolted three-phase faults F1-F4 are simulated, in PSCAD/EMTDC, one at a time on different lines of a five-bus islanded microgrid with one IBDG (Microgrid A) as shown in FIG. 3. This microgrid is a feeder of the Canadian urban benchmark distribution system. The 12.47 kV feeder is rated at 8.7 MVA. Each line is 1 km with an impedance of 0.1529+j0.1406Ω. At the point of common coupling (PCC), the utility has a short-circuit MVA of 500 MVA and an X/R ratio of 6. An IBDG rated at 10 MVA is connected to bus 1 through a 12.47 kV/480 V transformer with the same MVA rating as the IBDG. The loads are each 2 MVA at 0.95 power factor. This system has a unidirectional fault current, and only one relay per line is used. Given that the rated feeder current is 403 A, the minimum pickup current $I_{pu}$ of conventional phase/positive-sequence overcurrent relays is 1.5×403=604.5 A to adhere to common utility practice. The rated feeder current is 403 A, and $I_{dg,1}$=463 A. The parameters of the $I_{inj,1}{}^5$-$Z_{eq,1}$ characteristic are $Z_{pu,1}$=0.022Ω, $\lfloor I_{inj,1}{}^5 \rfloor$=24.18 A, $\lceil I_{inj,1}{}^5 \rceil$=305.58 A, and h=5.

Figure 4A:
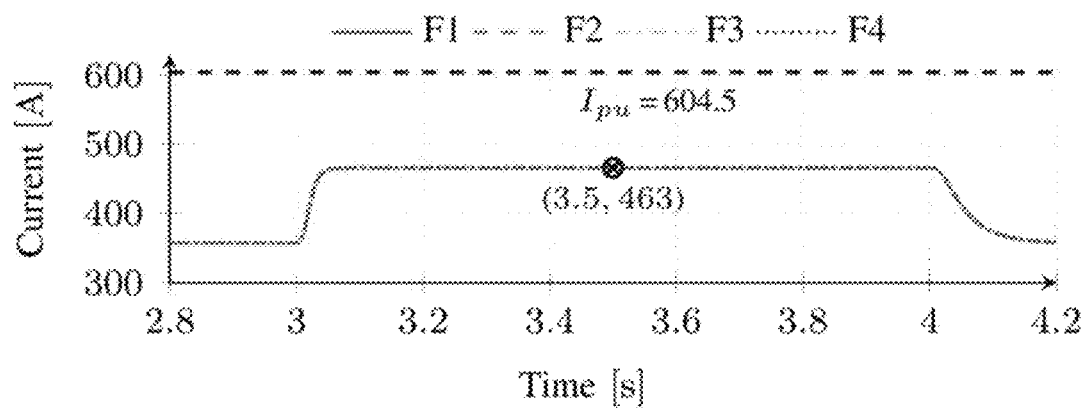
FIG. 4A is to be viewed in light of FIG. 3 and shows the fundamental positive-sequence current at different times during bolted three-phase faults in the microgrid in FIG. 3.
Figure 4B:
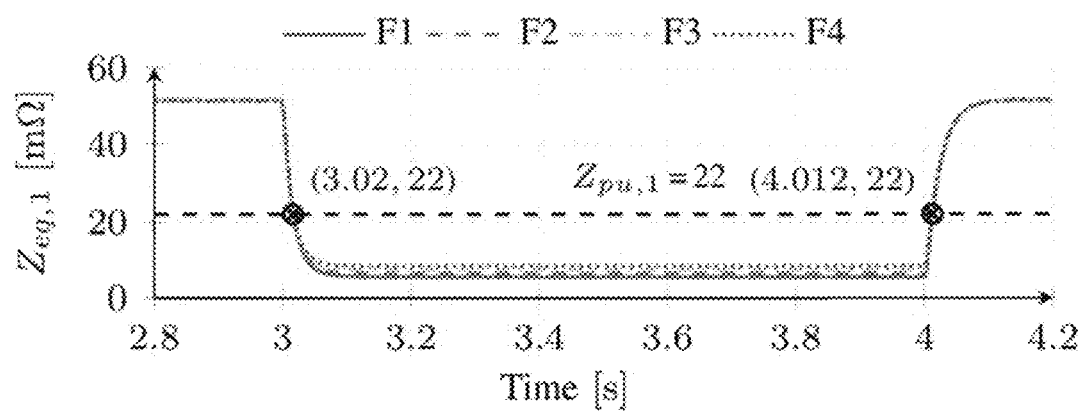
FIG. 4B is to be viewed in light of FIG. 3 and shows impedance characteristics at different times during bolted three-phase faults in the microgrid in FIG. 3.
Figure 4C:
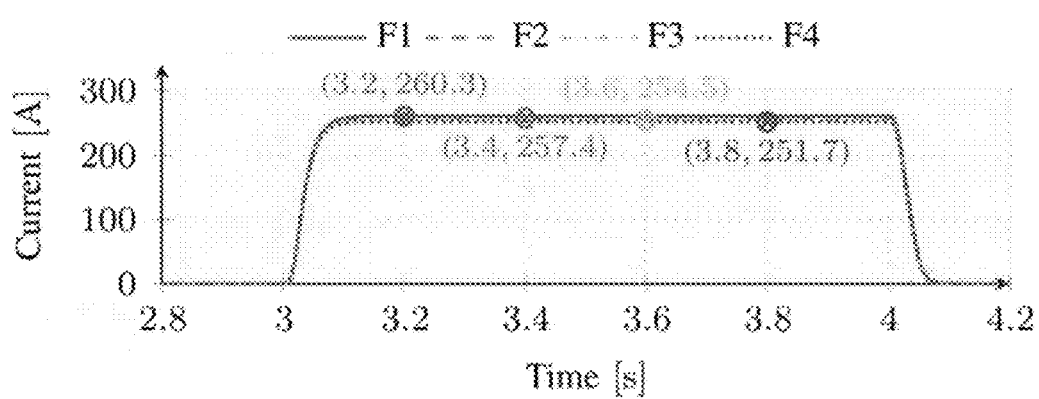
FIG. 4C is to be viewed in light of FIG. 3 and shows the fifth positive-sequence current at different times during bolted three-phase faults in the microgrid in FIG. 3.

FIG. 4A shows the fundamental positive-sequence current $I_{R1}{}^{+,1}$ measured by relay R1 during faults F1-F4 that occur at 3 s and clear at 4 s. $I_{R1}{}^{+,1}$ cannot be used for overcurrent protection because it (i) is lower than $I_{pu}$, and (ii) has the same magnitude for different fault locations. On the other hand, as shown in FIG. 4B, $Z_{eq,1}$ drops below $Z_{pu,1}$ at 3.02 s, which triggers the injection of $I_{inj,1}{}^5$ within 20 ms of the fault inception. The 5th positive-sequence harmonic current measured $I_{R1}{}^{+,5}$ by relay R1 during faults F1-F4 are 260.3, 257.4, 254.5, and 251.7 A, respectively (FIG. 4C). These currents are about 16 times higher than the individual harmonic current limit allowed by IEEE Standard 519 (i.e., 0.04×400=16 A). Therefore, unlike $I_{R1}^{+,1}$, $I_{R1}^{+,5}$ may be used for fault detection. Moreover, the difference in the magnitude of $I_{R1}^{+,5}$ for different fault locations enables coordination of primary and backup relays. Upon fault clearance at 4 s, $Z_{eq,1}$ increases above $Z_{pu,1}$ within 12 ms as may be seen from FIG. 4B, at which point injection of $I_{inj,1}^{5}$ is stopped as shown in FIG. 4C. Hence, $I_{inj,1}^{5}$ exists only during faults with no impact on the steady-state operation. This demonstrates the practicability of the inventive overcurrent function based on harmonic current for the HDOCR.

In terms of injection of multiple harmonic currents, placement of multiple IBDGs on a feeder creates new challenges such that the bidirectional flow of fault current mandates the utilization of (i) two relays per line, and (ii) directional elements to achieve selective protection action. A fault occurring on the line between two IBDGs n and m is fed by $I_{inj,n}^{h}$ and $I_{inj,m}^{h}$. Given that current flows in the path of least impedance (in this case, through the fault), relays on the IBDG n side of the fault will measure more of $I_{inj,n}^{h}$ than $I_{inj,m}^{h}$, and vice-versa. Advantageously, by having IBDGs n and m inject different harmonic orders, the current injected by each IBDG may be distinguished.

Figure 5:
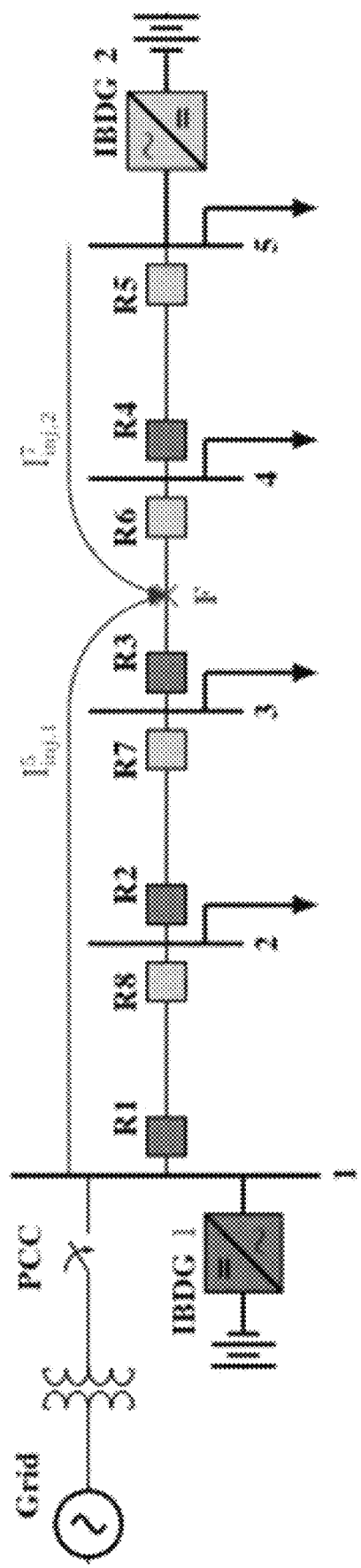
FIG. 5 is a single line diagram of a radial microgrid with two IBDGs (i.e., the same feeder of FIG. 3, but with an additional IBDG)
Figure 6A:
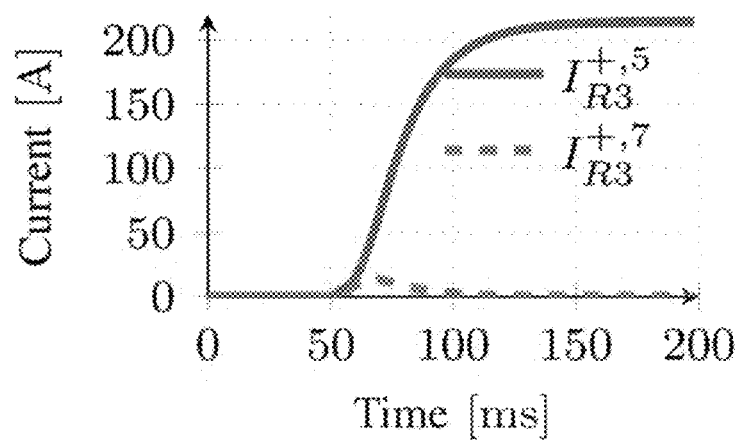
FIG. 6A are positive sequence harmonic currents measured by HDOCRSs R3, during a bolted three-phase fault in the microgrid in FIG. 5.
Figure 6B:
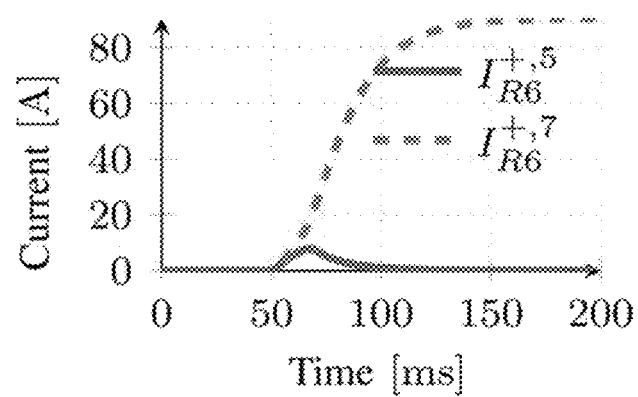
FIG. 6B are positive sequence harmonic currents measured by HDOCRSs R6, during a bolted three-phase fault in the microgrid in FIG. 5.
Figure 6C:
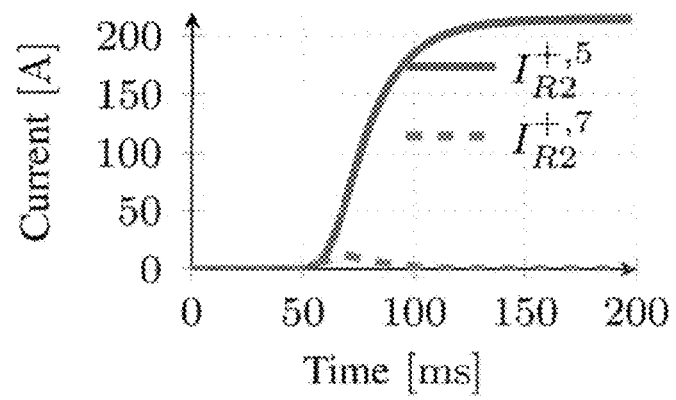
FIG. 6C are positive sequence harmonic currents measured by HDOCRSs R2, during a bolted three-phase fault in the microgrid in FIG. 5.
Figure 6D:
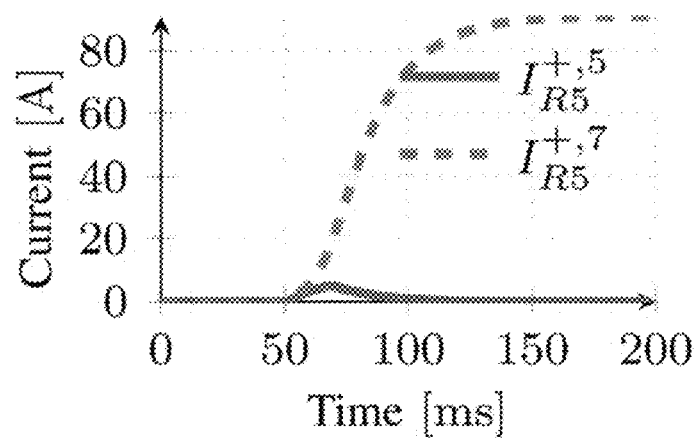
FIG. 6D are positive sequence harmonic currents measured by HDOCRSs R5, during a bolted three-phase fault in the microgrid in FIG. 5.
Figure 6E:
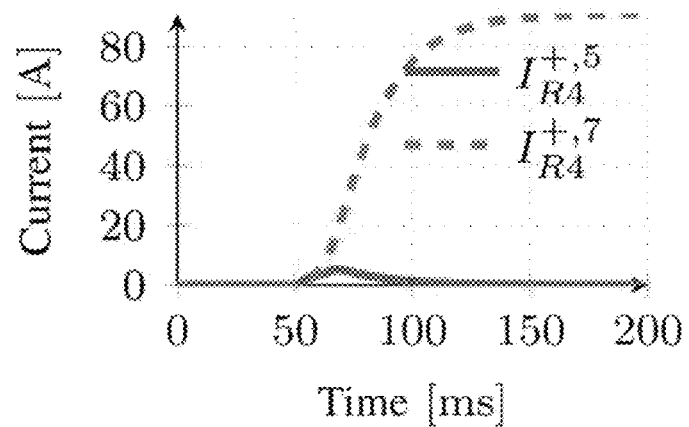
FIG. 6E are positive sequence harmonic currents measured by HDOCRSs R4, during a bolted three-phase fault in the microgrid in FIG. 5.
Figure 6F:
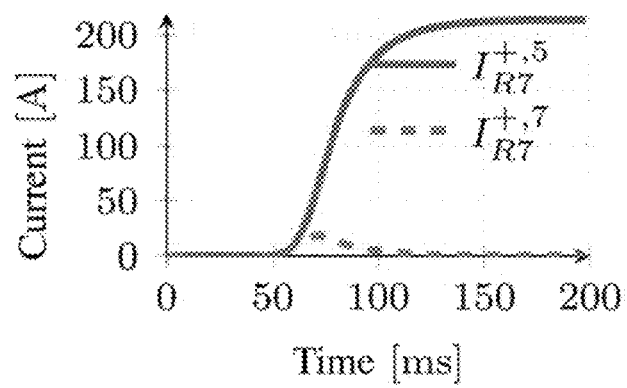
FIG. 6F are positive sequence harmonic currents measured by HDOCRSs R7, during a bolted three-phase fault in the microgrid in FIG. 5.

With regard to FIG. 5, there is shown the same feeder of FIG. 3, but with an additional IBDG at bus 5 (Microgrid B). IBDGs 1 and 2 are rated at 7 and 3 MVA and inject $I_{inj,1}^{5}$ and $I_{inj,2}^{7}$, respectively. For IBDG1, the parameters of the $I_{inj,1}^{5}$-$Z_{eq,1}$ characteristic are $Z_{pu,1}$=0.075Ω, $\lceil I_{inj,1}^{5} \rceil$=214.97 A. For IBDG2, $Z_{pu,2}$=0.125Ω, $\lceil I_{inj,2}^{7} \rceil$=92.13 A. A bolted three-phase is simulated on F at 50 ms.

FIG. 6 shows that before the fault, the measured 5th and 7th harmonic currents are almost zero, i.e., IBDGs do not inject harmonics. After the fault, however, R3, R2, and R7 on the left side of the fault (IBDG1), measure higher $I_{R3}^{+,5}$, $I_{R2}^{+,5}$, and $I_{R7}^{+,5}$ than $I_{R3}^{+,7}$, $I_{R2}^{+,7}$, and $I_{R7}^{+,7}$, respectively. Similarly, R4, R5, and R6 on the right side of the fault (IBDG2), measure higher 7th than a 5th harmonics. This property of multiple harmonic currents injection is used to design a directional element based on the ratio of $I_{Rx}^{+,h_n}$ and $I_{Rx}^{+,h_m}$ measured by each relay (where x is the relay identifier).

It should be understood that generalization of the above observations is applicable with regard to IBDGs of different sizes and locations in radial and ring microgrids. In such topologies, no two neighboring IBDGs should inject the same harmonic component. For a microgrid with an odd number of IBDGs, a total of three different harmonic components (3, 5, and 7) is required; for a microgrid with an even number of IBDGs, only two different harmonic components (5 and 7) are needed.

Figure 7:
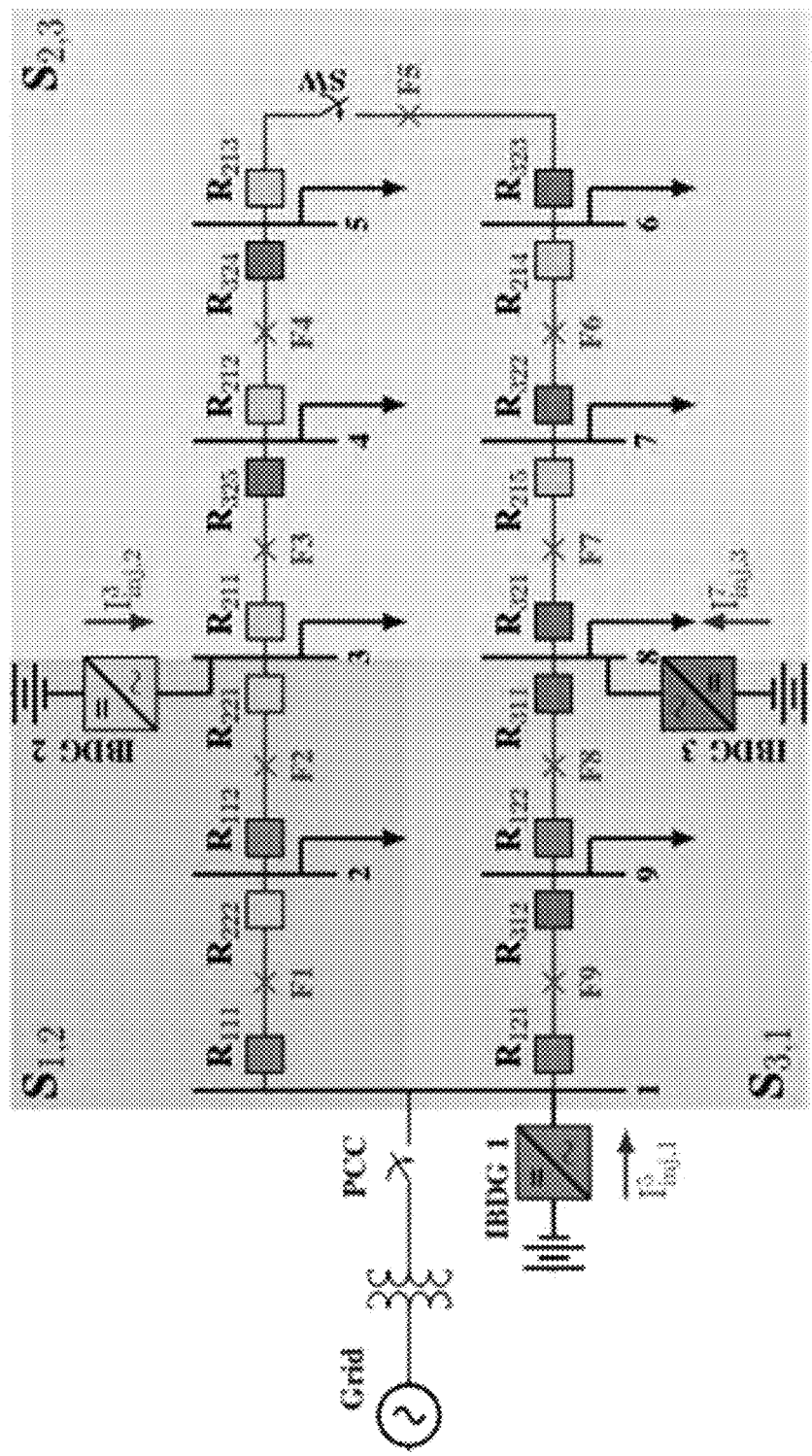
FIG. 7 is a single-line diagram of a microgrid ring with three IBDGs.
Figure 8:
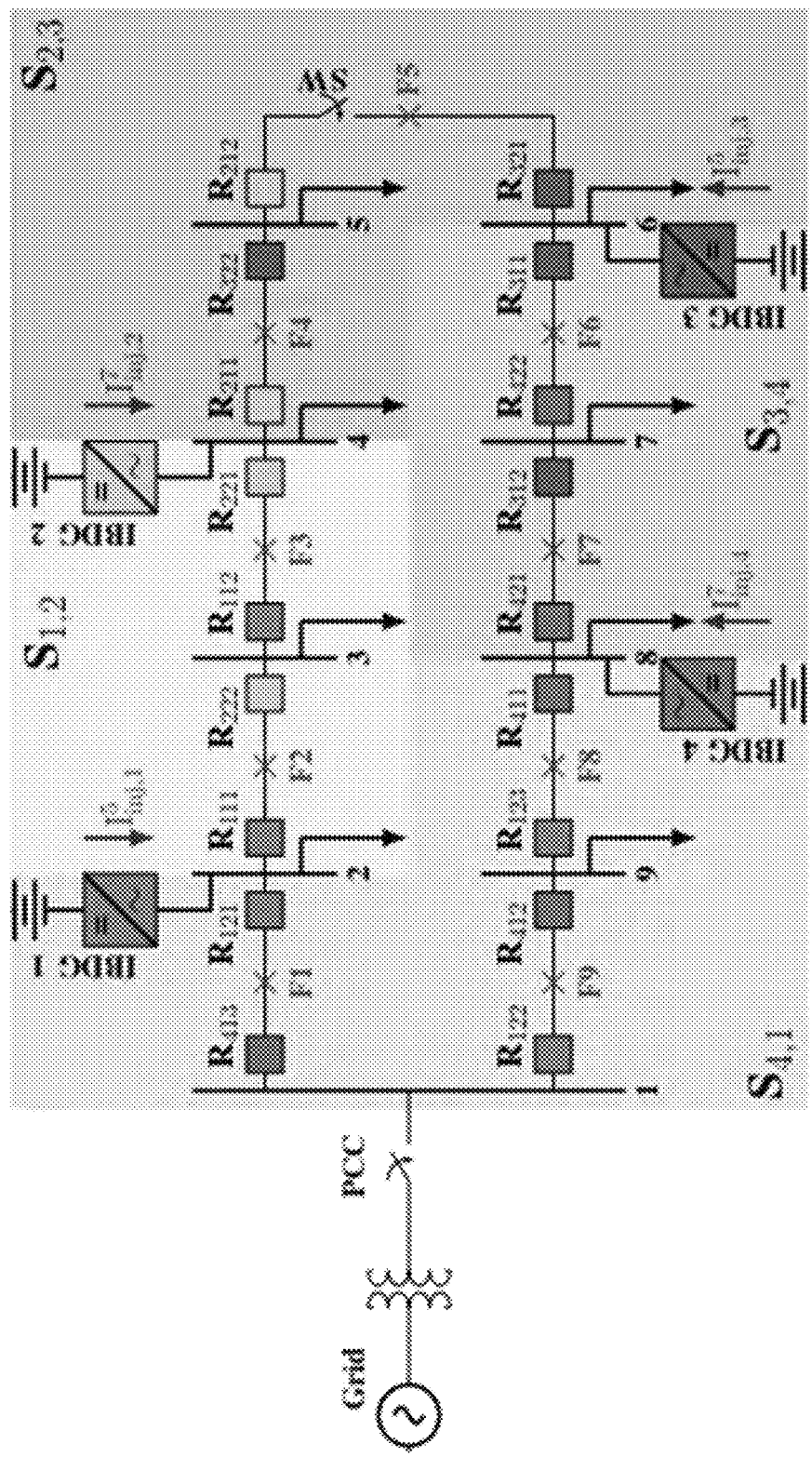
FIG. 8 is a single-line diagram of a microgrid ring with four IBDGs.

In general, to achieve alternating injection of harmonic components for any number of IBDGs and any microgrid size, a maximum of three harmonic components is required. For instance, FIG. 7 and FIG. 8 show a nine-bus test microgrid with three and four IBDGs, denoted as microgrids C and D, respectively. These microgrids are an expansion of microgrid A by the addition of a second feeder with the same specifications and loading. The two feeders are connected via switch SW between buses 5 and 6 to form a ring. For microgrid C, IBDGs 1, 2, and 3 inject three different harmonic orders, $I_{inj,1}^{5}$, $I_{inj,2}^{3}$, and $I_{inj,3}^{7}$, respectively. For microgrid D, however, IBDGs 1, 2, 3, and 4 inject only two harmonic orders, $I_{inj,1}^{5}$, $I_{inj,2}^{7}$, $I_{inj,3}^{5}$, and $I_{inj,4}^{7}$, respectively.

Figure 9:
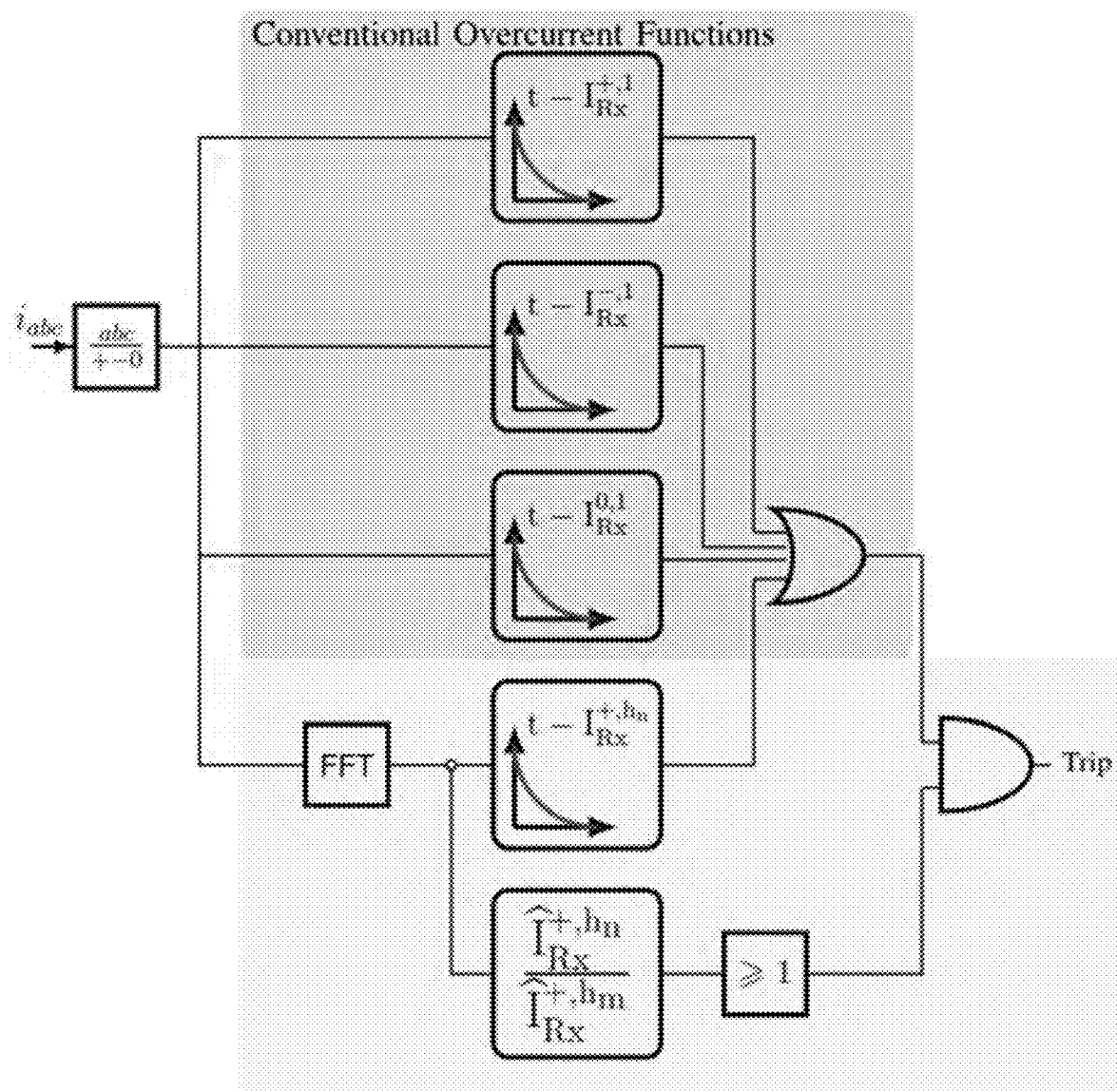
FIG. 9 illustrates a harmonic directional overcurrent relaying logic according to one aspect of the present invention.

With regard to FIG. 9, a logic schematic for the the inventive harmonic directional overcurrent relaying (HDOCR) methodology is shown in yellow. This logic is augmented to the existing overcurrent functions, and thus only reprogramming of existing microprocessor-based DOCRs is needed. Typically, current transformers (CT) are designed to measure the maximum fault current seen by a relay in the grid-connected mode. These CTs will not provide the needed resolution to differentiate between the different levels of low harmonic current magnitudes injected by IBDGs in islanded microgrids. To address this issue, each relay is equipped with two CTs: (i) a CT to measure high fault currents in grid-connected mode, and (ii) a CT to measure low harmonic currents with high resolution. The new CT that measures low harmonic currents is designed based on the maximum harmonic current injection seen by its associated relay in islanded microgrids.

Three-phase currents measured by both CTs of the relay are converted to positive-sequence, negative-sequence, and zero-sequence currents. Conventional overcurrent functions based on fundamental negative $I_{Rx}^{-,1}$ and zero sequence currents $I_{Rx}^{0,1}$ can effectively detect asymmetrical phase-to-phase and ground faults, respectively. Moreover, in the grid-connected mode, positive-sequence current $I_{Rx}^{+,1}$ may be used to detect three-phase faults due to the high current contribution from the grid. One of ordinary skill would understand that operation and setting of $t-I_{Rx}^{+,1}$, $t-I_{Rx}^{-,1}$, and $t-I_{Rx}^{0,1}$ for grid-connected three-phase, asymmetrical and ground faults are standard procedure and therefore are not discussed further herein.

The present description focuses on selective detection of faults in islanded microgrids based on $I_{Rx}^{+,h_n}$. As shown in FIG. 9, a trip signal is issued if any of the four inverse-time functions operate and the directional element flags a forward fault. Unlike the existing methods, the inventive HDOCR logic decouples the overcurrent functions required to detect faults in grid-connected and islanded modes. Hence, the fault detection and protection coordination tasks are significantly simplified.

The present invention will now be described with regard to an inventive overcurrent element with an inverse time-harmonic-current characteristic, a harmonic currents based directional element, and a PCO model for HDOCRs in radial and ring islanded microgrids.

In terms of the inverse time-harmonic-current characteristic, the present system and method uses $I_{Rx}^{+,h_n}$ in the inverse-time characteristic to detect a balanced three-phase fault in the islanded mode. This current is calculated based on the FFT of the positive sequence current. In a microgrid with multiple IBDGs, and thus multiple harmonic current injections, each HDOCR locally measures two harmonic currents: $I_{Rx}^{+,h_n}$ and $I_{Rx}^{+,h_m}$. $I_{Rx}^{+,h_n}$ corresponds to and is in the same direction as $I_{inj,n}^{h}$ of IBDG n, and similarly for $I_{Rx}^{+,h_m}$. Therefore, HDOCRs set with direction from IBDGs n to m are put into one group; they are common in that they operate based on $I_{Rx}^{+,h_n}$ and use $I_{Rx}^{+,h_m}$ to determine the fault direction (as discussed in the next subsection).

Similarly, HDOCRs with direction from IBDGs m to n are put into a second group; they are common in that they operate based on $I_{Rx}^{+,h_m}$ and use $I_{Rx}^{+,h_n}$ to determine the fault direction. The number of HDOCR groups depends on the number of IBDGs. Microgrid B, for example, has two groups: (i) G1 for R1, R2, R3, and R4, operating based on the 5th harmonic injected by IBDG1, and (ii) G2 for R5, R6, R7, and R8 operating based on the 7th harmonic by IBDG2. Microgrid D, on the other hand, has four groups: cyan G1, yellow G2, green G3, and purple G4.

Each HDOCR is denoted as $R_{gdx}$ with three identifiers: group g, injection flow direction (not fault current direction) d, and relay order x in a given group and direction; d is 1 for clockwise, and 2 for anti-clockwise injection. For a given g and d, x identifies HDOCRs on lines between two IBDGs. For instance, $R_{211}$ in FIG. 7 is the first in G2, clockwise direction and $R_{321}$ is the first in G3, anti-clockwise direction. While several inverse-time characteristics typically follow either the IEEE or IEC standards, the characteristic defined by IEC 60255-151:2009 is used here for HDOCRs in accordance with Equation 4:

$$t_{R_{gdx}} = TDS_{R_{gdx}} \frac{A}{\left(\frac{I_{R_{gdx}}^{+,h_n}}{I_{pu-R_{gdx}}}\right)^B - 1} \qquad \text{(Eq. 4)}$$

where $t_{R_{gdx}}$ is the trip time. A and B are constants, set to 0.14 and 0.02, to obtain the standard inverse characteristic. Time dial setting $TDS_{R_{gdx}}$ and pickup current $I_{pu-R_{gdx}}$ are used to set the HDOCR operating characteristic.

The present invention also includes a harmonic directional element that has a harmonic current index $HCI_{Rx}$ and a comparator whereby $HCI_{Rx}$ is computed in accordance with Equation 5:

$$HCI_{Rx} = \frac{\hat{I}_{Rx}^{+,h_n}}{\hat{I}_{Rx}^{+,h_m}} \qquad \text{(Eq. 5)}$$

where $\hat{I}_{Rx}^{+,h_n}$ and $\hat{I}_{Rx}^{+,h_m}$ are $I_{Rx}^{+,h_n}$ and $I_{Rx}^{+,h_m}$ normalized by their respective IBDG $\lceil I_{inj,n}^{h} \rceil$ and $\lceil I_{ing,m}^{h} \rceil$. This normalization is necessary because of the different ratings of IBDGs. $HCI_{Rx}$ is greater than 1 for a forward fault; otherwise a reverse fault is flagged. For better plotting, the $HCI_{Rx}$ output are limited to 1.5 to avoid excessively large values.

Figure 10:
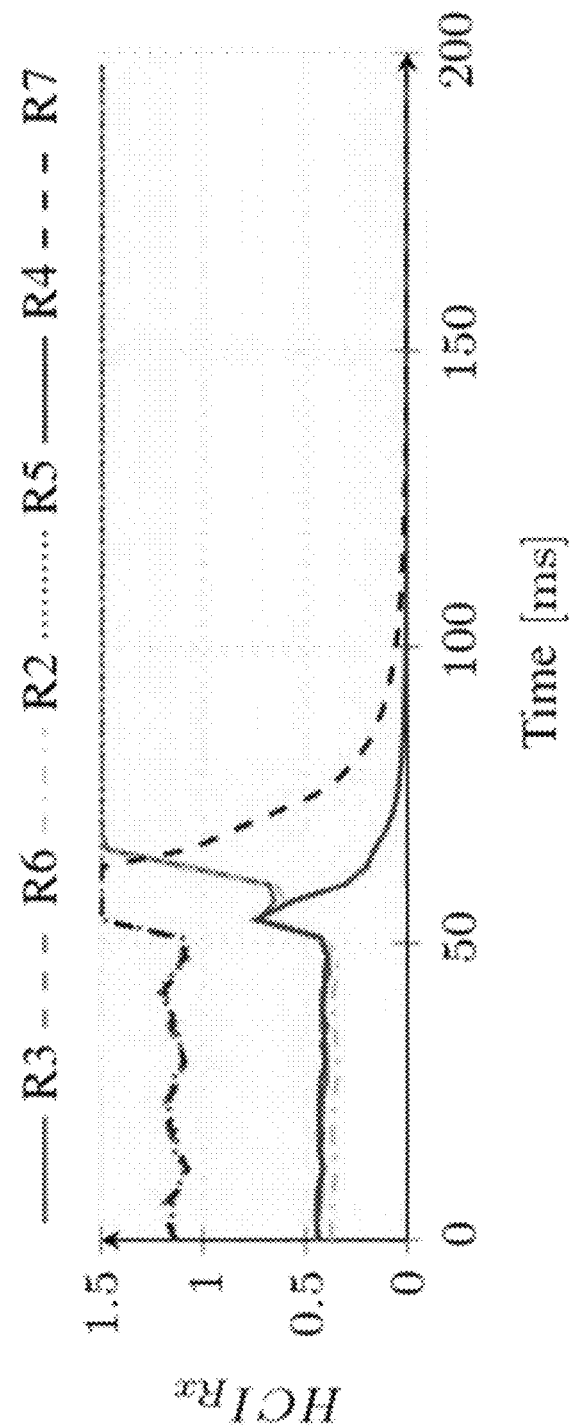
FIG. 10 illustrates the harmonic current indices for R3, R6, R2, R4, and R7 during bolted three-phase fault in the microgrid in FIG. 5.

With regard to the present invention implemented with two IBDGs and in the the case of a bolted three-phase fault at F in microgrid B as previously discussed above, FIG. 10 illustrates harmonic current indices of R3, R6, R2, R5, R4, and R7 during bolted three-phase fault in microgrid B. In particular, FIG. 10 shows the $HCI_{Rx}$ of HDOCRs on the faulted and adjacent lines. The $HCI_{Rx}$ value in pre-fault condition is not meaningful but this does not impact the inventive protection method because $I_{Rx}^{+,h_n}$ of each HDOCR is below the pickup value. When a fault occurs, $HCI_{R3}$ and $HCI_{R2}$ become greater than 1, flagging a forward fault, while $HCI_{R7}$ is less than 1, indicating a reverse fault (from its perspective). Similarly, on the other side of the fault, a forward fault is flagged by R6 and R5 because $HCI_{R6}$ and $HCI_{R5}$ are greater than 1, and a reverse fault is flagged by R4 as $HCI_{R4}<1$. After the fault inception, a transient period of 20 ms associated with the start of IBDG harmonic current injection may lead to inaccurate calculation of $HCI_{Rx}$. Consequently, the directional element blocks the operation of HDCORs for the first 20 ms to avoid nuisance tripping. This observation is used as a criteria for setting the minimum operation time of HDOCRs in the protection coordination problem discussed earlier.

With regard to the present invention implemented with multiple IBDGs, the microgrid is divided into segments $S_{n,m}$, which are marked by its two end IBDGs in addition to HDOCR groups. The number of segments depends on the number of IBDGs. The HDOCRs within each segment calculate $HCI_{R_{gdx}}$ based on $I_{R_{gdx}}^{+,h_n}$ and $I_{R_{gdx}}^{+,h_m}$ injected by the boundary IBDGs n and m. For instance, microgrid C with three IBDGs has three segments (see FIG. 7), and microgrid D with four IBDGs has four segments (see FIG. 8), each in a different color. Each IBDG injects $I_{inj,n}^{h}$ either clockwise or counterclockwise, depending on the fault location. Therefore, HDOCRs of each group also belong to two segments with d=1 and d=2. For instance, HDOCRs in G2, colored yellow, in microgrid C are in both $S_{1,2}$ and $S_{2,3}$.

Figure 11A:
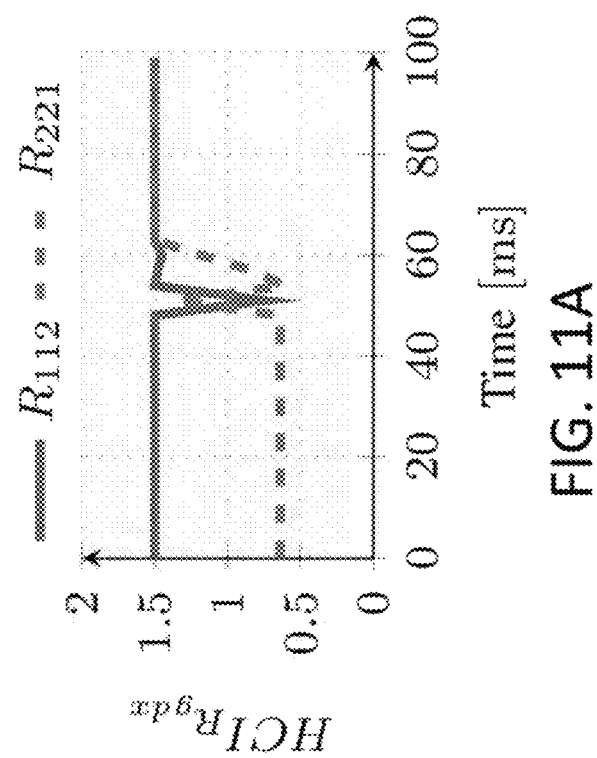
FIG. 11A shows the harmonic current indices of a primary HDOCR during bolted three-phase fault at F2 in the microgrid in FIG. 7.
Figure 11B:
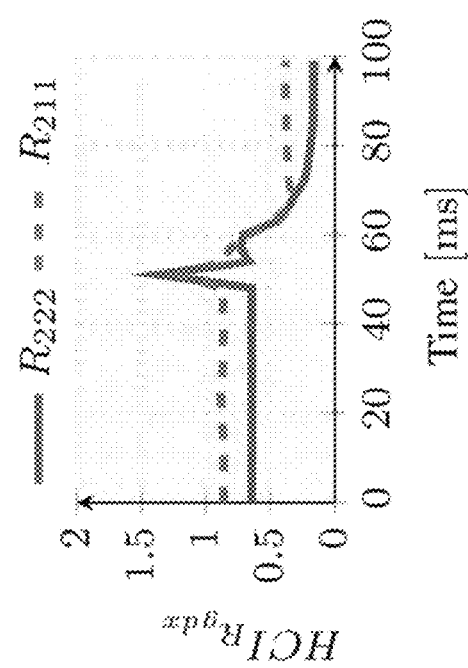
FIG. 11B shows the harmonic current indices of a reverse HDOCR during bolted three-phase fault at F2 in the microgrid in FIG. 7.
Figure 12A:
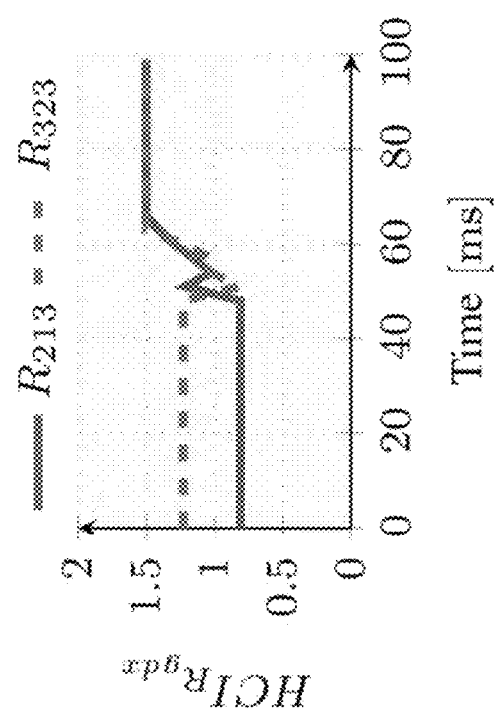
FIG. 12A shows the harmonic current indices of a primary HDOCR during bolted three-phase fault at F5 in the microgrid in FIG. 7.
Figure 12B:
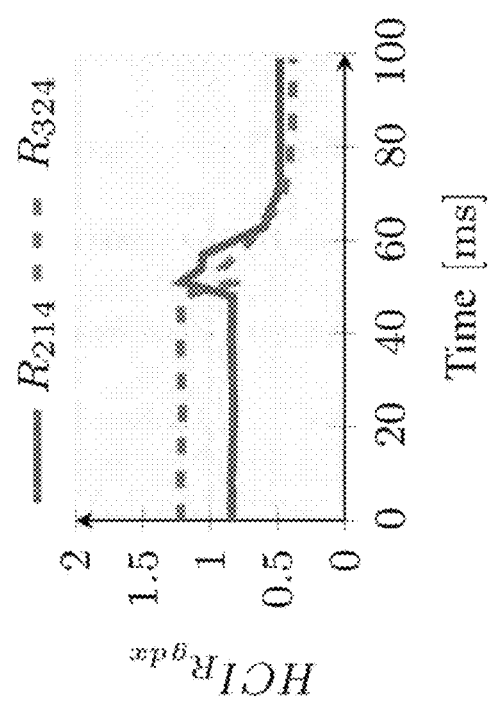
FIG. 12B shows the harmonic current indices of a reverse HDOCR during bolted three-phase fault at F5 in the microgrid in FIG. 7.
Figure 13A:
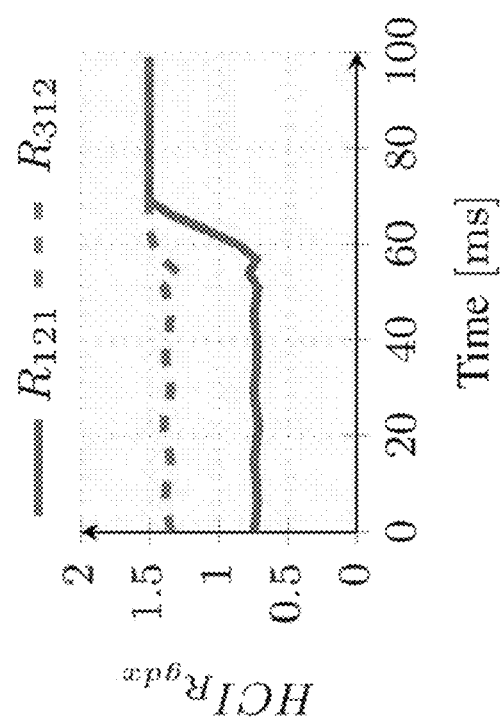
FIG. 13A shows the harmonic current indices of a primary HDOCR during bolted three-phase fault at F9 in the microgrid in FIG. 7.
Figure 13B:
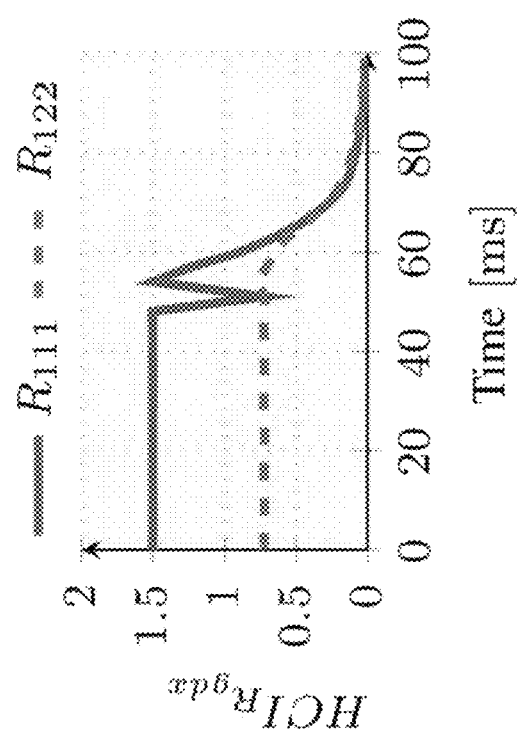
FIG. 13B shows the harmonic current indices of a reverse HDOCR during bolted three-phase fault at F9 in the microgrid in FIG. 7.

To demonstrate the effectiveness of this layout of HDOCRs and IBDGs in achieving accurate fault direction identification in ring microgrids, three faults, F2, F5, and F9, one in each segment, are simulated in microgrid C. For F2 at 50 ms, primary HDOCRs R112 and R221 in $S_{1,2}$ operate based on $I_{R112}^{+,5}$ and $I_{R221}^{+,3}$, respectively. FIG. 11 shows that R112 and R221 identify a forward fault because $HCI_{R112}$ and $HCI_{R221}$ are greater than one, while $R_{222}$ and $R_{211}$ flag a reverse fault because $HCI_{R222}$ and $HCI_{R211}$ are less than 1. Similar observations are seen from FIGS. 12 and 13 for faults F5 and F9. In this manner, the inventive directional element accurately identifies forward and reverse faults.

The present invention also provides an effective solution to problematic protection coordination optimization. Choosing $TDS_{R_{gdx}}$ and $I_{pu-R_{gdx}}$ for each HDOCR presents the protection coordination optimization (PCO) problem. The objective of PCO is to minimize the sum of the operating times of primary and backup HDOCRs due to near-end three-phase faults on all lines of a microgrid, subject to coordination, relay setting, and relay operating time constraints. Given the nonlinearity of $t_{R_{gdx}}$, PCO is a nonlinear program (NLP) given by Equation 6:

$$\min T = \sum_{g=1}^{G} \sum_{d=1}^{D} \sum_{x=1}^{X_{cd}} t_{R_{gdx}}^{p} + t_{R_{gdx}}^{b} \qquad \text{(Eq. 6)}$$

where G is the number of groups, D is the number of injection directions (maximum of 2 for a ring microgrid), and X is the number of relays in a given segment (dependent on g and d). Superscripts p and b denote primary and backup. Constraints are given by Equations 7 and 8:

$$\lfloor TDS_{R_{gdx}} \rfloor \leq TDS_{R_{gdx}} \leq \lceil TDS_{R_{gdx}} \rceil \quad \forall g,d,x \qquad \text{(Eq. 7)}$$

$$\lfloor I_{pu-R_{gdx}} \rfloor \leq I_{pu-R_{gdx}} \leq \lceil I_{pu-R_{gdx}} \rceil \quad \forall g,d,x \qquad \text{(Eq. 8)}$$

where $\lfloor TDS_{R_{gdx}} \rfloor$ and $\lceil TDS_{R_{gdx}} \rceil$ are the lower and upper bounds of $TDS_{R_{gdx}}$, set to 0.05 and 1, respectively [26]. Similarly, $\lfloor I_{pu-R_{gdx}} \rfloor$ and $\lceil I_{pu-R_{gdx}} \rceil$ are the lower and upper bounds of $I_{pu-R_{gdx}}$.

Based on common practice known in the art, $\lfloor I_{pu-R_{gdx}} \rfloor$ is set to 1.5 times higher than the maximum current measured in normal operating conditions. While near-end faults are commonly used to consider the most severe case scenario, far-end faults are used to calculate the minimum fault current, in this case $\lfloor I_{Rx}^{+,h_n} \rfloor$, which in turn determines $\lceil I_{pu-R_{gdx}} \rceil$ setting for each HDOCR. In practice, to set $\lceil I_{pu-R_{gdx}} \rceil$, most utilities divide the minimum three-phase fault current by three for short and by two for long lines to provide a 300% and 200% margin for fault resistance coverage [21]. Therefore, for the exemplary microgrids discussed herein, $\lceil I_{pu-R_{gdx}} \rceil$ is set to $\lfloor I_{Rx}^{+,h_n} \rfloor/2$. Constraints on primary operating time of each HDOCR are given by Equation 9:

$$t_{R_{gdx}}^{p} \geq \lfloor t_{R_{gdx}} \rfloor \quad \forall g,d,x \qquad \text{(Eq. 9)}$$

where $\lfloor t_{R_{gdx}} \rfloor$ is set to 20 ms to avoid the transient period.

An additional set of constraints is imposed to satisfy the protection coordination requirement. Each primary HDOCR in a microgrid requires a backup HDOCR to operate if it fails to isolate the fault in its zone. Hence, the coordination time interval (CTI) is the minimum gap between the operation of the primary and backup HDOCRs. In the present embodiment, CTI is chosen to be 0.2 s. For radial and ring microgrids, Equation 10 represents the coordination constraint between all HDOCR pairs except for the ones on segment boundaries.

$$t_{R_{gdx}}^b - t_{R_{gd(x+1)}}^p \geq CTI \; \forall g, d, x \in [1, X_{gd}) \quad \text{(Eq. 10)}$$

The constraint for HDOCRs at segment boundaries are given by Equations 11 and 12:

$$t_{R_{g1X_{g1}}}^b - t_{R_{g11}}^p \geq CTI \; \forall g \in [1, G) \quad \text{(Eq. 11)}$$

$$t_{R_{g2X_{g2}}}^b - t_{R_{g21}}^p \geq CTI \; \forall g \in (1, G] \quad \text{(Eq. 12)}$$

Likewise, constraints for ring microgrids are given by Equations 13 and 14:

$$t_{R_{G1X_{G1}}}^b - t_{R_{111}}^p \geq CTI \quad \text{(Eq. 13)}$$

$$t_{R_{12X_{12}}}^b - t_{R_{G21}}^p \geq CTI \quad \text{(Eq. 14)}$$

Moreover, to clear the fault simultaneously from both sides of a line to avoid the topology change impacting other HDOCRs, the following constraint is added by Equations 15 and 16:

$$t_{R_{g,1,x}}^p = t_{R_{g+1,2,X_{g+1,2}-x+1}}^p, \; \forall g \in [1, G), x \quad \text{(Eq. 15)}$$

$$t_{R_{G,1,x}}^p = t_{R_{1,2,X_{1,2}-x+1}}^p, \; \forall x \quad \text{(Eq. 16)}$$

In terms of the requirements for practical implementation of the present invention, it should be noted that the changes required to an existing microgrid in order to adopt the inventive system and method are primarily software-based. Underlying the present invention, it is presumed that the given microgrid implementing the present invention is equipped with two programmable microprocessor-based directional overcurrent relays per line, i.e., one at each end. It should be understood that this is a standard and the most basic requirement for any microgrid protection with bidirectional flow of fault current. Notwithstanding this commonality among microgrids, the following modifications would be required from the inverter, relay, and utility perspectives in order to implement the present invention.

From an inverter perspective, waveform generation in inverters is a software function. In virtually all modern inverters, certainly those for integration of renewable energy resources, waveform generation is performed via PWM, which involves comparing a reference waveform with a triangular carrier waveform. The present inventive harmonic injection method effectively modifies the reference signal from a purely sinusoidal waveform to one that includes the prescribed harmonic component. However, augmenting the reference waveform with certain harmonics to achieve specific functionalities does not present any cost implication associated with implementing the harmonic injection function, as it may be easily implemented in a similar manner as typical third-harmonic injection functions.

From a relay perspective, microprocessor-based directional overcurrent relays are essentially "computers" and may be reprogrammed to include (i) online FFT calculation, and (ii) the inventive directional harmonic overcurrent functions highlighted in FIG. 9. Therefore, the modifications that need to be implemented by the relay manufacturer are software-based and have zero incremental cost and no additional hardware requirement. On the contrary, conventional directional overcurrent relays require potential transformers (PT) for the directional element while the method of the present invention may operate based on current only, i.e., fewer devices are required.

From a utility perspective, determining relay settings using optimization to achieve protection coordination is a common approach used in distribution systems with DGs. The optimization process is performed offline. While the inventive optimization methodology is different, no changes are required to the procedure that utilities employ to set relays in their systems Performance of the present inventive system and method under various fault conditions was assessed on microgrid D with four IBDGs as illustrated in FIG. 8. FIG. 16 summarizes ratings and harmonic injection characteristics for each IBDG. [$I_L$] for all lines is 403 A. The PCO problem with regard to Equations 6 through 16 was solved using MATLAB's interior-point algorithm based on the reduced gradient approach for constrained nonlinear optimization problems. FIG. 17 presents the optimal $TDS_{R_{gdx}}$ and $I_{pu\text{-}R_{gdx}}$ settings for HDOCRs. Using $I_L$, $\lfloor I_{pu\text{-}R_{gdx}} \rfloor$ was calculated as 24.18 A. All $I_{pu\text{-}R_{gdx}}$ values were much higher than 16 A, i.e., $0.04 \times I_L$, which is the maximum individual current harmonic that exists in each line during steady-state operations. Hence, it is almost impossible for HDOCRs to pickup under normal conditions.

Figure 14A:
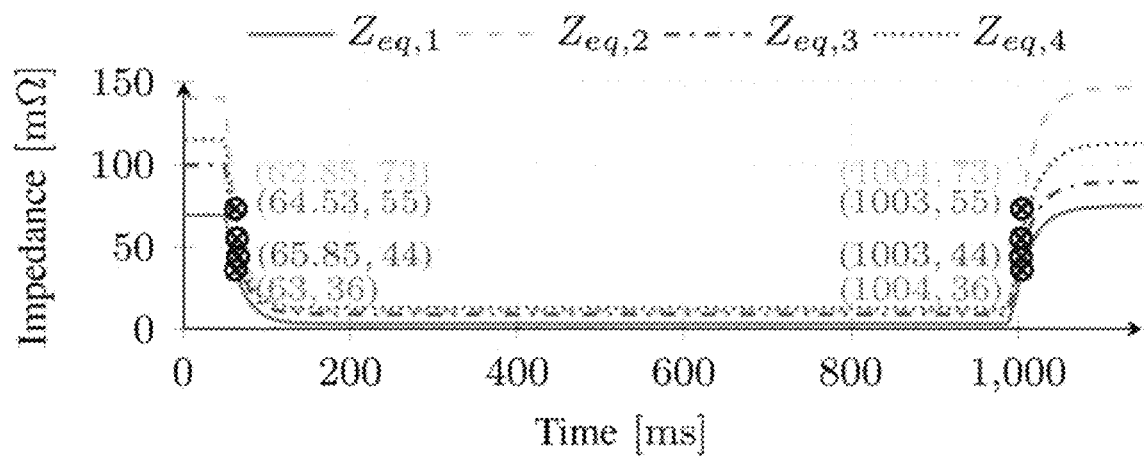
FIG. 14A shows the impedance of the HDOCRs on faulted and adjacent lines for a bolted three-phase fault at F3 in the microgrid in FIG. 8.

The present invention was assessed for fault conditions while in islanded mode. Here, a bolted three-phase fault was simulated at 50 ms at F3 close to bus 3. For this fault, the primary HDOCR $R_{112}$ had $R_{111}$ as its backup, and $R_{221}$ had $R_{322}$ as its backup. The sequence of events from the fault inception to clearance included:

1. $Z_{eq,1}$, $Z_{eq,2}$, $Z_{eq,3}$, and $Z_{eq,4}$ dropped below their respective $Z_{pu}$ (FIG. 16) after 13, 12.85, 15.85 and 14.53 ms, See FIG. 14A.

Figure 14B:
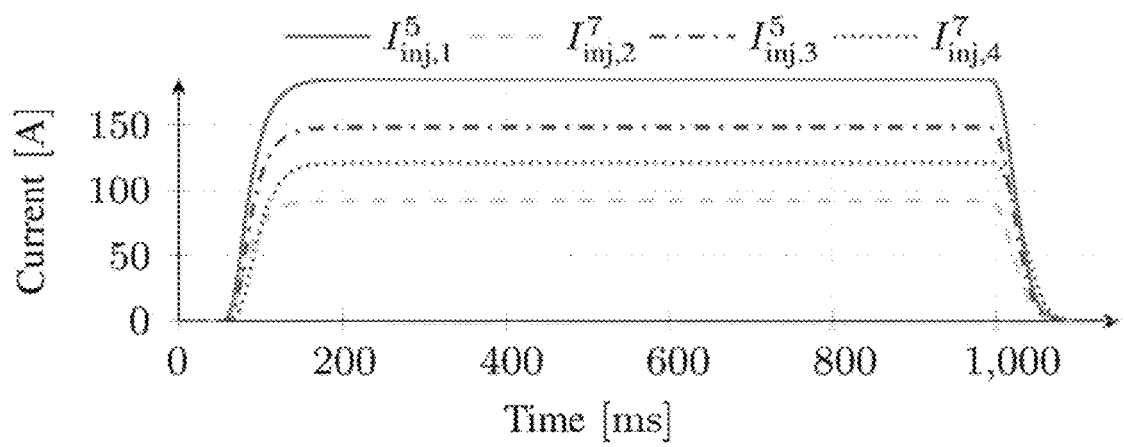
FIG. 14B shows the injected current of the HDOCRs on faulted and adjacent lines for a bolted three-phase fault at F3 in the microgrid in FIG. 8.

2. All four IBDGs started injecting $I_{inj,1}^5$, $I_{inj,2}^7$, $I_{inj,3}^5$, and $I_{inj,4}^7$ with a magnitude based on the characteristics, IBDG rating, and fault location, See FIG. 14B.

3. $I_{R_{112}}^{+,5}$, $I_{R_{221}}^{+,7}$, $I_{R_{111}}^{+,5}$, and $I_{R_{322}}^{+,5}$ measured locally by the primary and backup HDOCRs are above their respective $I_{pu}$ (See FIG. 15A). Therefore, all four HDOCRs may detect the fault.

Figure 14C:
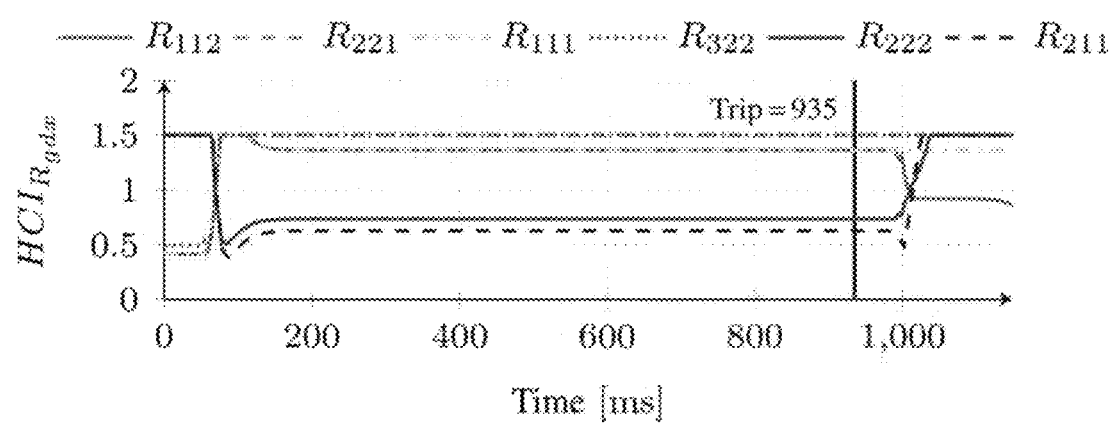
FIG. 14C shows the HCI of the HDOCRs on faulted and adjacent lines for a bolted three-phase fault at F3 in the microgrid in FIG. 8.

4. Concurrently, $HCI_{R_{gdx}}$ computed by HDOCRs on the faulted line, i.e., $R_{112}$ and $R_{221}$, exceeds 1, flagging a forward fault (See FIG. 14C). In addition, the $HCI_{R_{gdx}}$ s of HDCORs $R_{111}$ and $R_{322}$ on the adjacent lines also exceed 1, while for $R_{222}$ and $R_{211}$, $HCI_{R_{gdx}} < 1$. Accordingly, $R_{222}$ and $R_{211}$ identify a reverse (external) fault and block their operation.

Figure 15A:
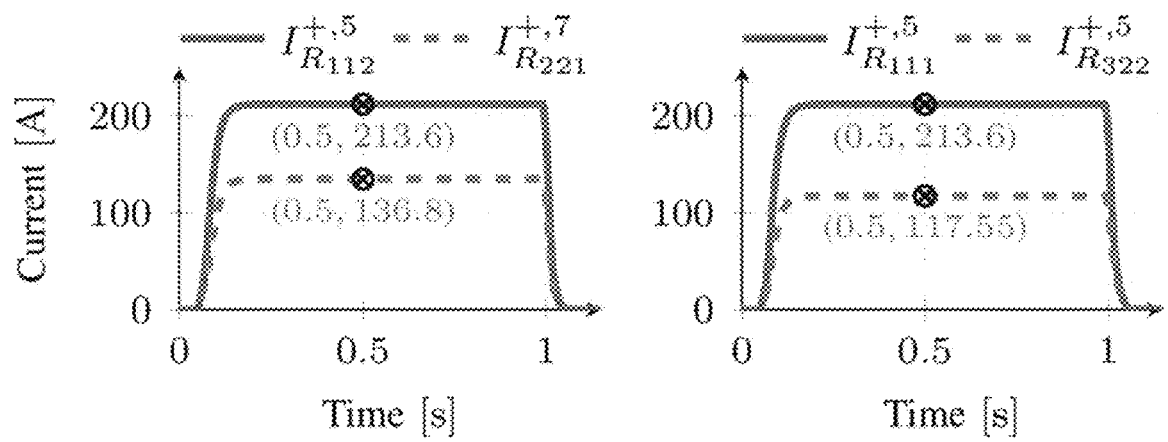
FIG. 15A shows current characteristics of HDOCR pairs for a bolted three-phase fault at F3 in the microgrid in FIG. 8.
Figure 15B:
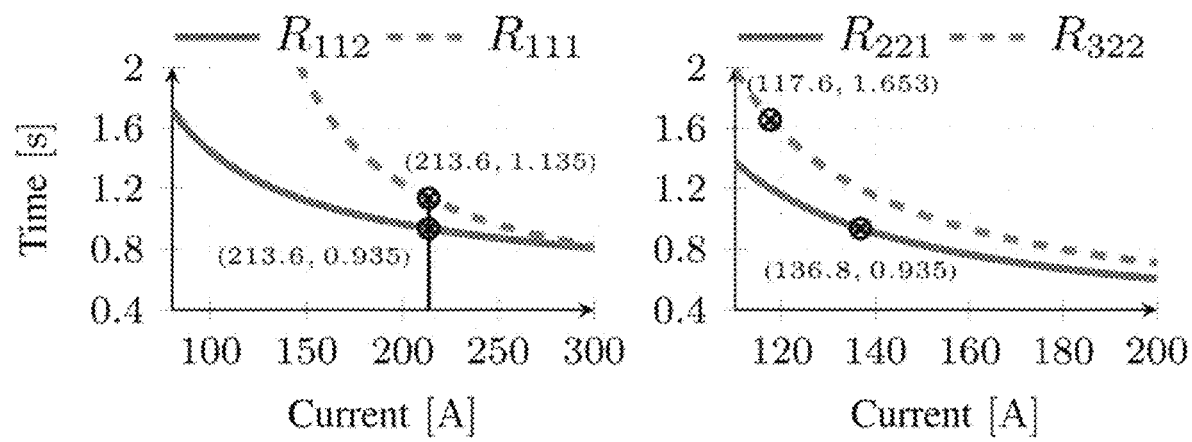
FIG. 15B shows inverse time-current characteristics of HDOCR pairs for a bolted three-phase fault at F3 in the microgrid in FIG. 8.

5. The operating time of each HDOCR was determined based on measured harmonic currents in FIG. 15A, optimal settings in FIG. 17, and characteristic as determined by Equation 4. FIG. 15A shows that both $I_{R_{112}}^{+,5}$ and $I_{R_{111}}^{+,5}$ are 213.6 A. As a result, $t_{R_{112}}$ and $t_{R_{111}}$ are 0.935 and 1.135 s, respectively (See left image in FIG. 15B). However, $I_{R_{221}}^{+,7}$ and $I_{R_{322}}^{+,5}$ have different magnitudes of 136.8 and 117.6 A, because they belong to different groups G2 and G3. $t_{R_{221}}$ and $t_{R_{322}}$ are 0.935 and 1.653 s (See right image in FIG. 15B).

Backup $t_{R_{111}}$ and $t_{R_{322}}$ are at least 0.2 s higher than their primary counterparts $t_{R_{112}}$ and $t_{R_{221}}$, and thus coordination was maintained.

6. Both primary HDCORs $R_{112}$ and $R_{221}$ operated and successfully isolated the faulted line 3-4 at 0.935 s.

7. $Z_{eq,1}$, $Z_{eq,2}$, $Z_{eq,3}$, and $Z_{eq,4}$ increased above their respective $Z_{pu}$ within about 68 ms of fault clearance (See FIG. 14A).

8. IBDGs halted injection of harmonic currents (See FIG. 14B).

9. Backups $R_{111}$ and $R_{322}$ did not operate because $I_{R_{111}}^{+,5}$ and $I_{R_{322}}^{+,5}$ dropped to zero before 1.135 and 1.653 s (See FIG. 15A).

In accordance with the sequences 1 through 9 above, the assessment demonstrated the effective and coordinated operation of the present inventive protection system and method, IBDGs control function and HDOCRs, in detecting and selectively isolating a faulted line in an islanded microgrid without communication.

The present invention was also evaluated in terms of fault resistance. FIG. 18 shows that the magnitude of harmonic currents measured by primary and backup HDOCRs during a three-phase fault at F7 (close to bus 7) decrease with an increase in fault resistance $R_f$. Consequently, the times obtained using (4) increase with $R_f$ but the primary-backup HDOCR pairs remain coordinated within 0.2 s. All associated HDOCRs are greater than one, flagging a forward fault. Hence, the element according to the present invention is not negatively impacted by an increase in $R_f$.

The present invention was also evaluated in terms of fault location. FIG. 19 shows harmonic currents, HCI, and operating times of HDOCRs during three-phase faults at F1-F9, close to the bus with lower identifier in a given line. $I_{R_{gdx}}^{+,h_n}$ and HCI values seen by primary and backup HDOCRs for each fault are higher than their respective $I_{pu}$ and 1, respectively. Therefore, the HDOCR pairs on each side of the line detect all faults in the forward direction. Moreover, backup HDOCRs operating times are at least 0.2 s higher than primary ones under all faults. Hence, coordination of HDOCR pairs and selectivity of the protection scheme according to one aspect of the present invention are maintained.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, programmable logic controllers, other related components, or as a combination of hardware and software components.

Embodiments may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for control of a microgrid, said system comprising:
    a plurality of inverter-based distributed generators within said microgrid, each one of said plurality of inverter-based distributed generators injecting into said microgrid a corresponding one of a plurality of differentiable harmonic currents upon a fault condition within said microgrid; and
    a plurality of directional overcurrent relays in said microgrid, said plurality of directional overcurrent relays being for detection of said harmonic currents;
    wherein isolation of a faulted section of said microgrid is enabled based upon said harmonic currents detected, and
    wherein, to locate said faulted section, said plurality of directional overcurrent relays use a ratio of said harmonic currents measured on both ends of a segment of said microgrid with each end of said segment having a microprocessor-based directional overcurrent relay.

2. The system as claimed in claim 1, wherein said harmonic currents are measured local to said microgrid.

3. The system as claimed in claim 2, wherein said plurality of differentiable harmonic currents vary by harmonic orders relative to adjacent ones of said plurality of inverter-based distributed generators along a common feeder.

4. The system as claimed in claim 3, wherein a backup protection unit coordinates between a primary relay and a backup relay.

5. A method for controlling a microgrid, said method comprising:
- providing to said microgrid, by way of a plurality of inverter-based distributed generators within said microgrid, a plurality of differentiable harmonic currents upon a fault condition within said microgrid;
- detecting, by way of a plurality of directional overcurrent relays in said microgrid, said harmonic currents; and
- isolating a faulted section of said microgrid based upon said harmonic currents detected,
- wherein, to locate said faulted section, said plurality of directional overcurrent relays use a ratio of said harmonic currents measured on both ends of a segment of said microgrid with each end of said segment having a microprocessor-based directional overcurrent relay.

6. The method as claimed in claim 5, wherein said harmonic currents are measured local to said microgrid.

7. The method as claimed in claim 6, wherein said plurality of differentiable harmonic currents vary by harmonic orders relative to adjacent ones of said plurality of inverter-based distributed generators along a common feeder.

8. The method as claimed in claim 7, wherein coordination, by way of a backup protection unit, is provided between a primary relay and a backup relay.

9. The method as claimed in claim 5, wherein, before said providing step, upgrading software installed on said plurality of inverter-based distributed generators and on said plurality of directional overcurrent relays to thereby allow said generators to provide said harmonic currents and to thereby allow said relays to detect and assess said harmonic currents.

* * * * *